US009568662B2

(12) United States Patent
Lim et al.

(10) Patent No.: US 9,568,662 B2
(45) Date of Patent: Feb. 14, 2017

(54) OPTICAL WAVEGUIDE BODY

(71) Applicant: Cree, Inc., Durham, NC (US)

(72) Inventors: Jin Hong Lim, Waxhaw, NC (US); Jason Taylor, Cary, NC (US); Kurt S. Wilcox, Libertyville, IL (US); Zongjie Yuan, Libertyville, IL (US); John W. Durkee, Raleigh, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/776,478

(22) PCT Filed: Mar. 15, 2014

(86) PCT No.: PCT/US2014/030017
§ 371 (c)(1),
(2) Date: Sep. 14, 2015

(87) PCT Pub. No.: WO2014/145283
PCT Pub. Date: Sep. 18, 2014

(65) Prior Publication Data
US 2016/0047969 A1    Feb. 18, 2016

Related U.S. Application Data

(63) Continuation-in-part of application No. 13/839,949, filed on Mar. 15, 2013, and a continuation-in-part of
(Continued)

(51) Int. Cl.
*G02B 6/26* (2006.01)
*F21V 8/00* (2006.01)
(Continued)

(52) U.S. Cl.
CPC ............. *G02B 6/0045* (2013.01); *F21K 9/61* (2016.08); *G02B 6/0021* (2013.01);
(Continued)

(58) Field of Classification Search
USPC .................................................. 385/27, 146
See application file for complete search history.

(56) References Cited

U.S. PATENT DOCUMENTS

| 3,372,740 A | 3/1968 | Kastovich et al. |
| 5,676,457 A | 10/1997 | Simon |

(Continued)

FOREIGN PATENT DOCUMENTS

| WO | WO 2009/099547 | 8/2009 |
| WO | WO 2012/042938 | 4/2012 |
| WO | WO 2014-145283 | 9/2014 |

OTHER PUBLICATIONS

International Search Report and Written Opinion for International Application No. PCT/US2015/020601, dated Jul. 31, 2015, Applicant, Cree, Inc. (23 pages).

(Continued)

*Primary Examiner* — Eric Wong
(74) *Attorney, Agent, or Firm* — McCracken & Gillen LLC

(57) ABSTRACT

An optical waveguide body includes first and second pluralities of light extraction features disposed on a first side of the waveguide body and adapted to direct light out of the waveguide body through a second side of the waveguide body opposite the first side. Each of the first plurality of light extraction features has a linear shape and each of the second plurality of light extraction features has at least one of a piecewise linear shape and a nonlinear shape. The piecewise linear shape comprises two adjacent planar surfaces with an angle therebetween of at least about 30 and at most about 180 degrees. The waveguide body further has a light coupling cavity.

20 Claims, 34 Drawing Sheets

Related U.S. Application Data application No. 14/101,099, filed on Dec. 9, 2013, and a continuation-in-part of application No. 13/840,563, filed on Mar. 15, 2013, and a continuation-in-part of application No. 13/841,074, filed on Mar. 15, 2013, and a continuation-in-part of application No. 13/841,622, filed on Mar. 15, 2013, and a continuation-in-part of application No. 13/842,521, filed on Mar. 15, 2013, and a continuation-in-part of application No. 13/938,877, filed on Jul. 10, 2013, and a continuation-in-part of application No. 14/015,801, filed on Aug. 30, 2013, now Pat. No. 9,291,320, and a continuation-in-part of application No. 14/101,051, filed on Dec. 9, 2013, and a continuation-in-part of application No. 14/101,086, filed on Dec. 9, 2013, and a continuation-in-part of application No. 14/101,129, filed on Dec. 9, 2013, and a continuation-in-part of application No. 14/101,147, filed on Dec. 9, 2013, and a continuation-in-part of application No. PCT/US2014/013931, filed on Jan. 30, 2014, and a continuation-in-part of application No. PCT/US2014/013937, filed on Jan. 30, 2014.

(60) Provisional application No. 61/922,017, filed on Dec. 30, 2013.

(51) Int. Cl.

| | | |
|---|---|---|
| *G02B 6/30* | (2006.01) | |
| *G02B 6/32* | (2006.01) | |
| *G02B 6/34* | (2006.01) | |
| *G02B 6/24* | (2006.01) | |
| *F21W 131/10* | (2006.01) | |
| *F21Y 105/00* | (2016.01) | |
| *F21Y 101/00* | (2016.01) | |

(52) U.S. Cl.
CPC .......... *G02B 6/0031* (2013.01); *G02B 6/0035* (2013.01); *G02B 6/0036* (2013.01); *G02B 6/0038* (2013.01); *G02B 6/0058* (2013.01); *G02B 6/0061* (2013.01); *G02B 6/24* (2013.01); *G02B 6/262* (2013.01); *G02B 6/305* (2013.01); *G02B 6/32* (2013.01); *G02B 6/34* (2013.01); *F21W 2131/10* (2013.01); *F21Y 2101/00* (2013.01); *F21Y 2105/00* (2013.01)

(56) References Cited

U.S. PATENT DOCUMENTS

| | | | |
|---|---|---|---|
| 5,839,823 A | 11/1998 | Hou et al. | |
| 5,863,113 A | 1/1999 | Oe et al. | |
| 6,443,594 B1 | 9/2002 | Marshall et al. | |
| 6,554,451 B1 | 4/2003 | Keuper | |
| 7,008,097 B1 | 3/2006 | Hulse | |
| 7,090,370 B2 | 8/2006 | Clark et al. | |
| 7,488,093 B1 | 2/2009 | Huang et al. | |
| 7,534,013 B1 | 5/2009 | Simon | |
| 7,566,159 B2 | 7/2009 | Oon et al. | |
| 7,593,615 B2 * | 9/2009 | Chakmakjian | G02B 6/0028 349/117 |
| 7,628,508 B2 | 12/2009 | Kita et al. | |
| 7,635,205 B2 | 12/2009 | Yu et al. | |
| 7,641,363 B1 | 1/2010 | Chang et al. | |
| 7,736,019 B2 | 6/2010 | Shimada et al. | |
| 7,810,960 B1 | 10/2010 | Soderman et al. | |
| 7,813,131 B2 | 10/2010 | Liang | |
| 8,277,106 B2 | 10/2012 | Van Gorkom et al. | |
| 8,287,152 B2 | 10/2012 | Gill | |
| 8,317,366 B2 | 11/2012 | Dalton et al. | |
| 8,353,606 B2 | 1/2013 | Jeong | |
| 8,382,387 B1 | 2/2013 | Sandoval | |
| 8,408,737 B2 | 4/2013 | Wright et al. | |
| 8,419,224 B2 | 4/2013 | Wan-Chih et al. | |
| 8,434,892 B2 | 5/2013 | Zwak et al. | |
| 8,434,893 B2 | 5/2013 | Boyer et al. | |
| 8,475,010 B2 | 7/2013 | Vissenberg et al. | |
| 8,485,684 B2 | 7/2013 | Lou et al. | |
| 8,547,022 B2 | 10/2013 | Summerford et al. | |
| 8,567,983 B2 | 10/2013 | Boyer et al. | |
| 8,573,823 B2 | 11/2013 | Dau et al. | |
| 8,593,070 B2 | 11/2013 | Wang et al. | |
| 9,099,592 B2 | 8/2015 | Derryberry et al. | |
| 2005/0024849 A1 | 2/2005 | Parker et al. | |
| 2006/0034579 A1 | 2/2006 | Sugiura | |
| 2007/0115569 A1* | 5/2007 | Tang | G02B 5/021 359/831 |
| 2008/0002399 A1 | 1/2008 | Villard et al. | |
| 2009/0180196 A1* | 7/2009 | Li | G02B 3/0056 359/641 |
| 2010/0238671 A1 | 9/2010 | Catone et al. | |
| 2010/0301360 A1 | 12/2010 | Van De Ven et al. | |
| 2010/0302783 A1 | 12/2010 | Shastry et al. | |
| 2010/0302802 A1 | 12/2010 | Bita et al. | |
| 2011/0044022 A1 | 2/2011 | Ko et al. | |
| 2011/0233568 A1 | 9/2011 | An et al. | |
| 2011/0305027 A1 | 12/2011 | Ham | |
| 2011/0317436 A1 | 12/2011 | Kuan | |
| 2012/0026728 A1 | 2/2012 | Lou et al. | |
| 2012/0069580 A1* | 3/2012 | Derryberry | G02B 3/0043 362/311.02 |
| 2012/0152490 A1 | 6/2012 | Wen et al. | |
| 2012/0287654 A1 | 11/2012 | He et al. | |
| 2012/0287677 A1 | 11/2012 | Wheatley et al. | |
| 2012/0307496 A1 | 12/2012 | Phillips et al. | |
| 2013/0003363 A1 | 1/2013 | Lu et al. | |
| 2013/0128593 A1 | 5/2013 | Luo | |
| 2013/0170210 A1 | 7/2013 | Athalye | |
| 2013/0215612 A1 | 8/2013 | Garcia | |
| 2013/0250584 A1 | 9/2013 | Wang et al. | |
| 2013/0300310 A1 | 11/2013 | Hu et al. | |
| 2013/0343045 A1 | 12/2013 | Lodhie et al. | |
| 2013/0343055 A1 | 12/2013 | Eckert et al. | |
| 2013/0343079 A1 | 12/2013 | Unger et al. | |
| 2014/0029257 A1 | 1/2014 | Boyer et al. | |
| 2015/0055369 A1 | 2/2015 | Tarsa et al. | |
| 2015/0055371 A1 | 2/2015 | van de Ven et al. | |
| 2015/0160396 A1 | 6/2015 | Wilcox et al. | |
| 2015/0253488 A1 | 9/2015 | Wilcox et al. | |

OTHER PUBLICATIONS

Invitation to Pay Additional Fees for International Application No. PCT/US2015/020601 dated Jun. 5, 2015, Applicant, Cree, Inc. (2 pages).
International Search Report and Written Opinion for International Application No. PCT/US14/30017, dated Aug. 1, 2014, Applicant, Cree, Inc., (21 pages).
IPRP for International Application No. PCT/US2014/030017, dated Sep. 24, 2015, Applicant, Cree, Inc., (15 pages).
Supplementary European Search Report dated Nov. 18, 2016 for European Application No. 14763315, Applicant, Cree, Inc. (4 pages).

* cited by examiner

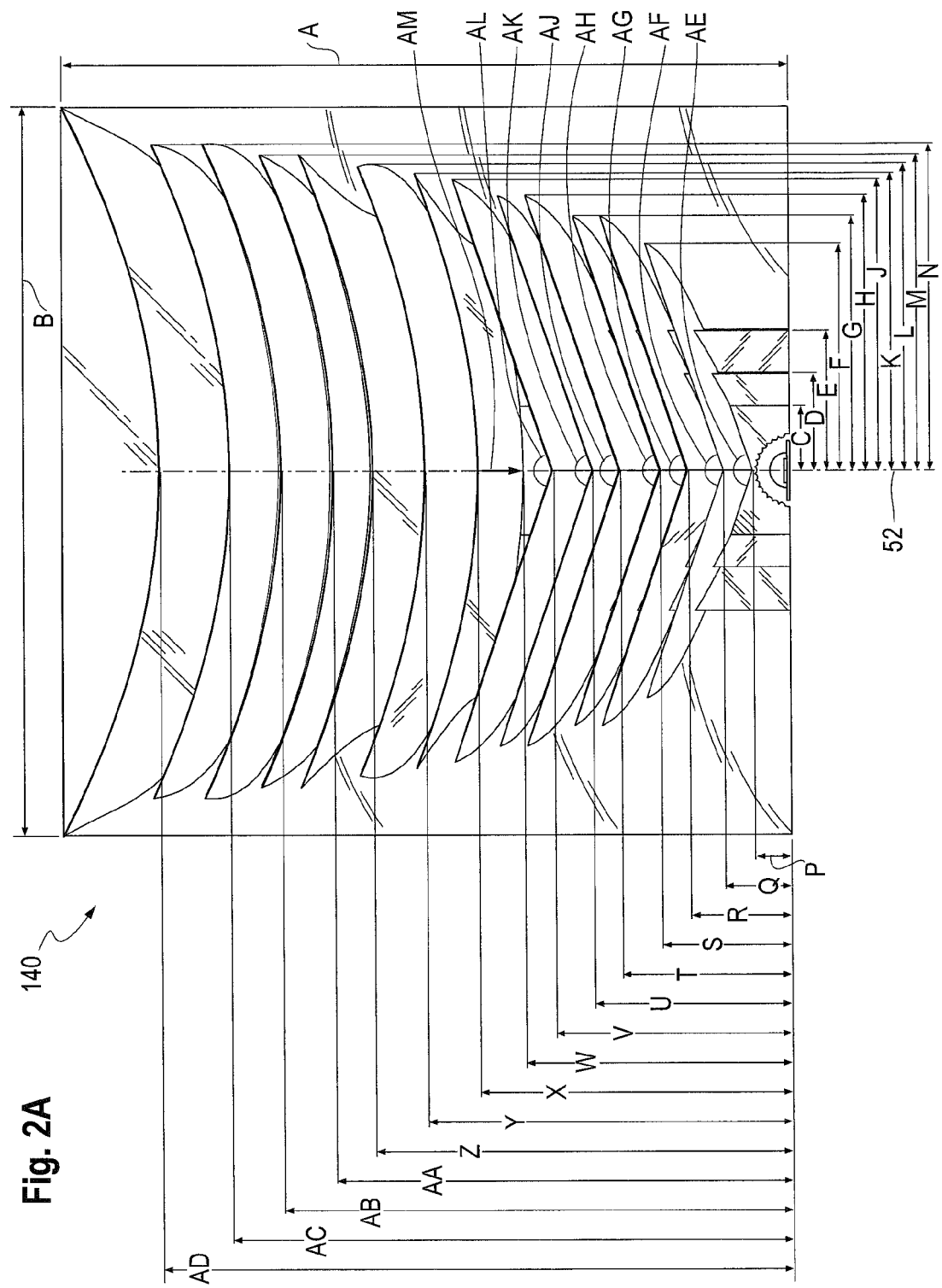

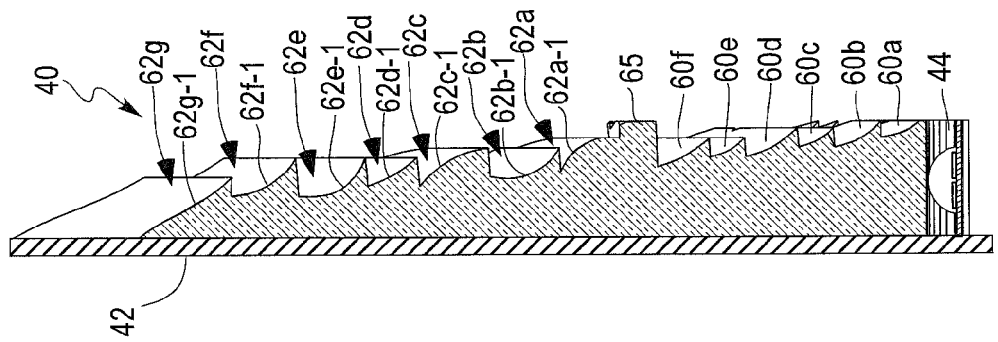
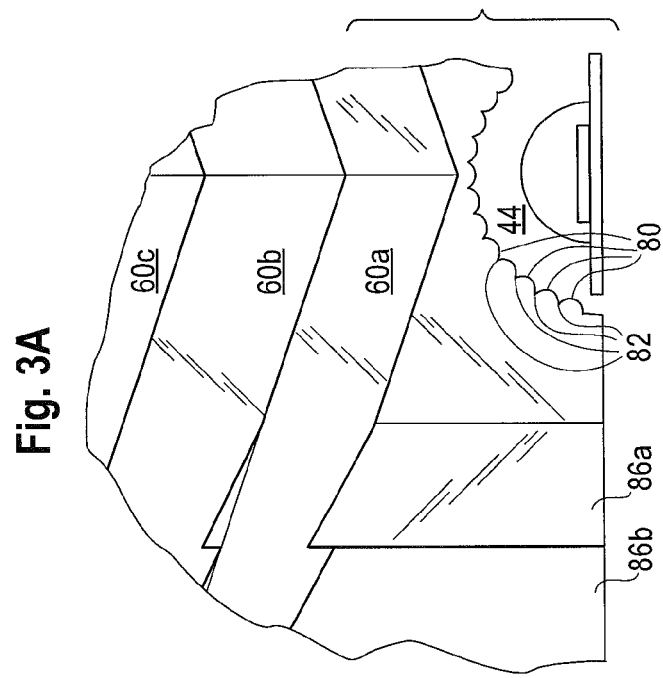
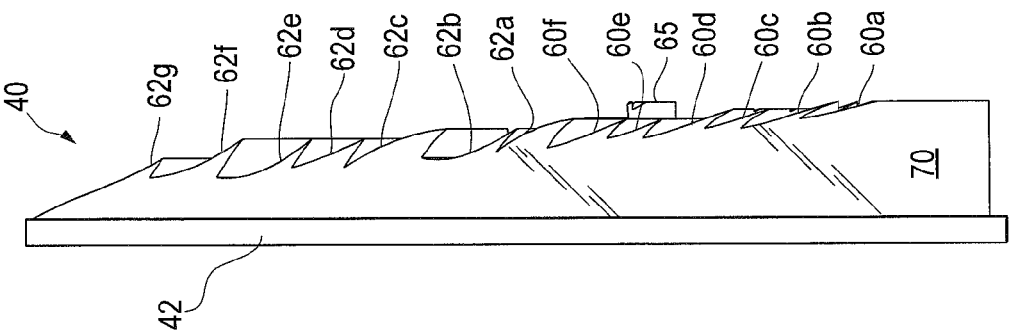

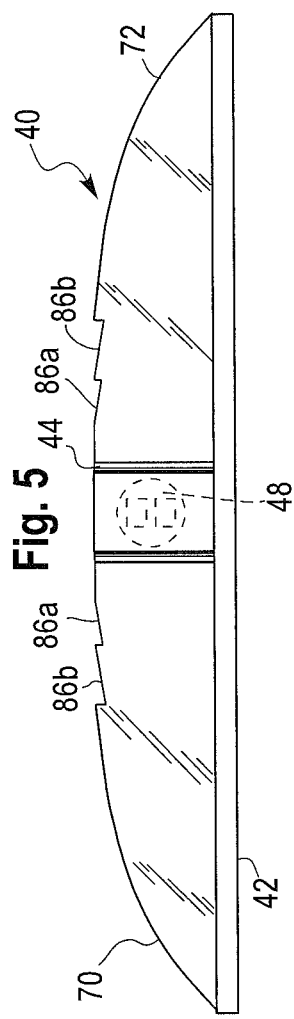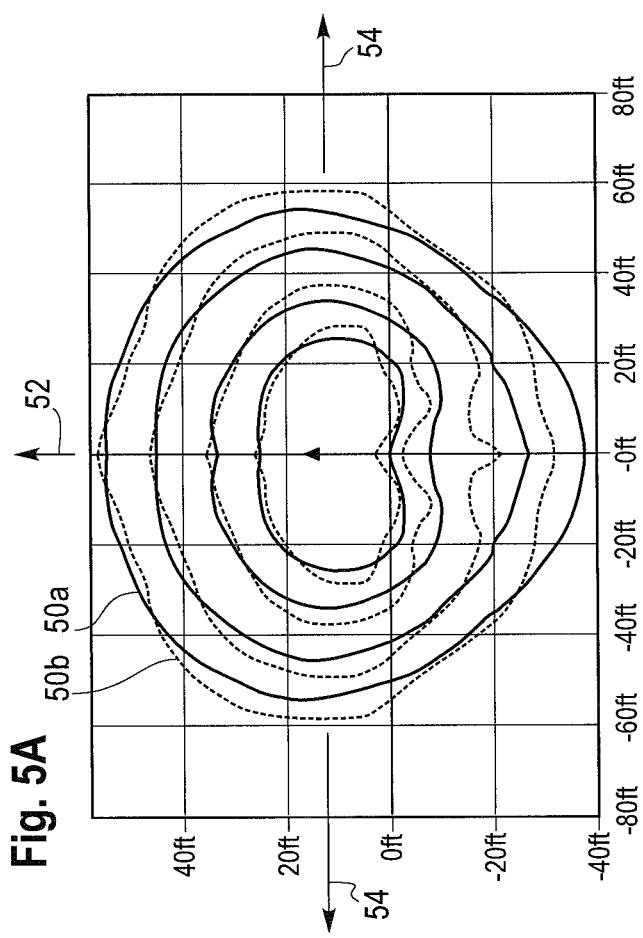

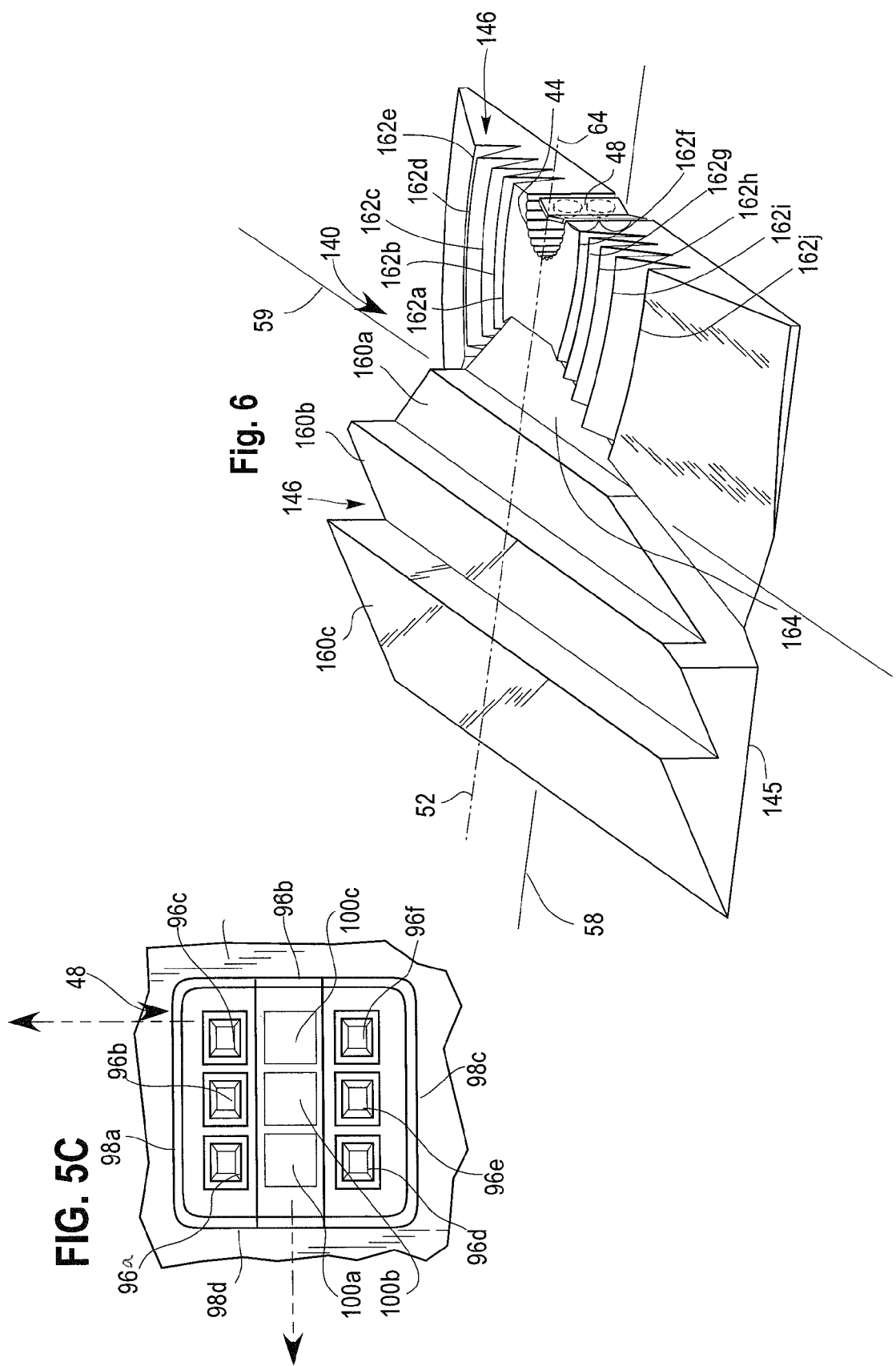

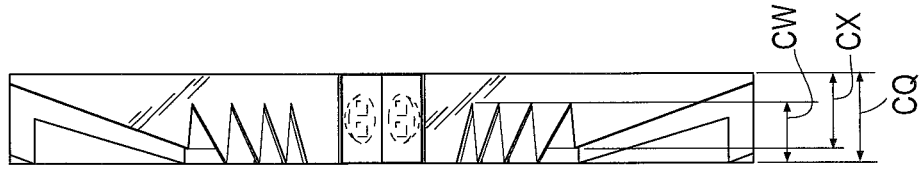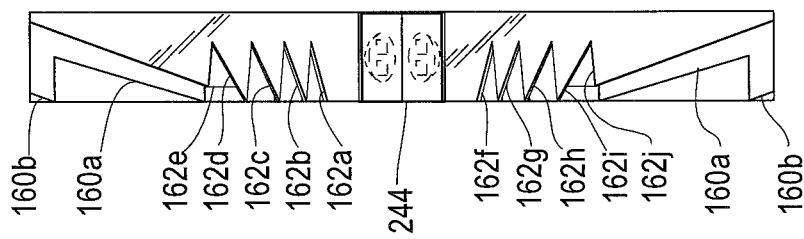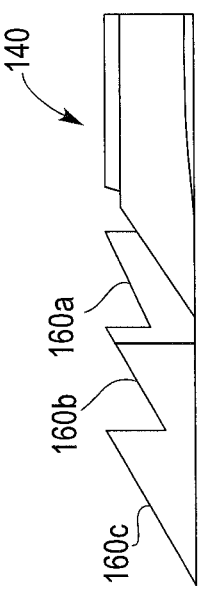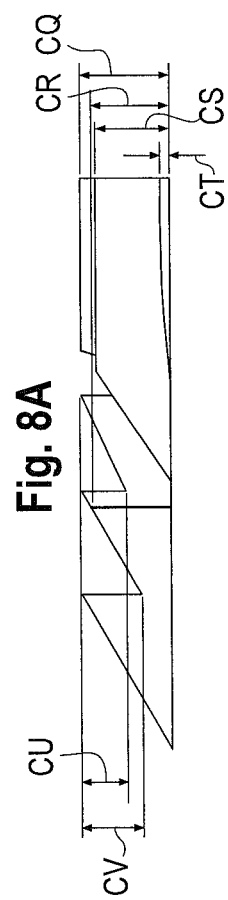

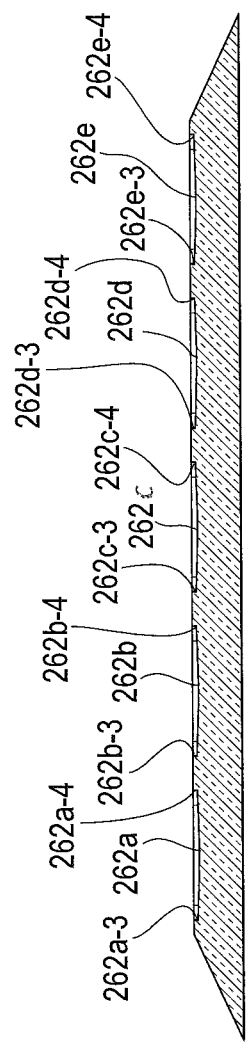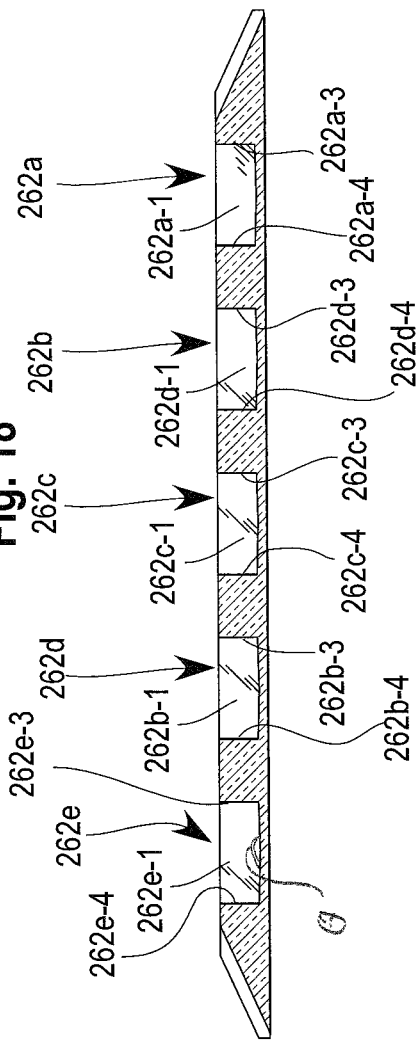

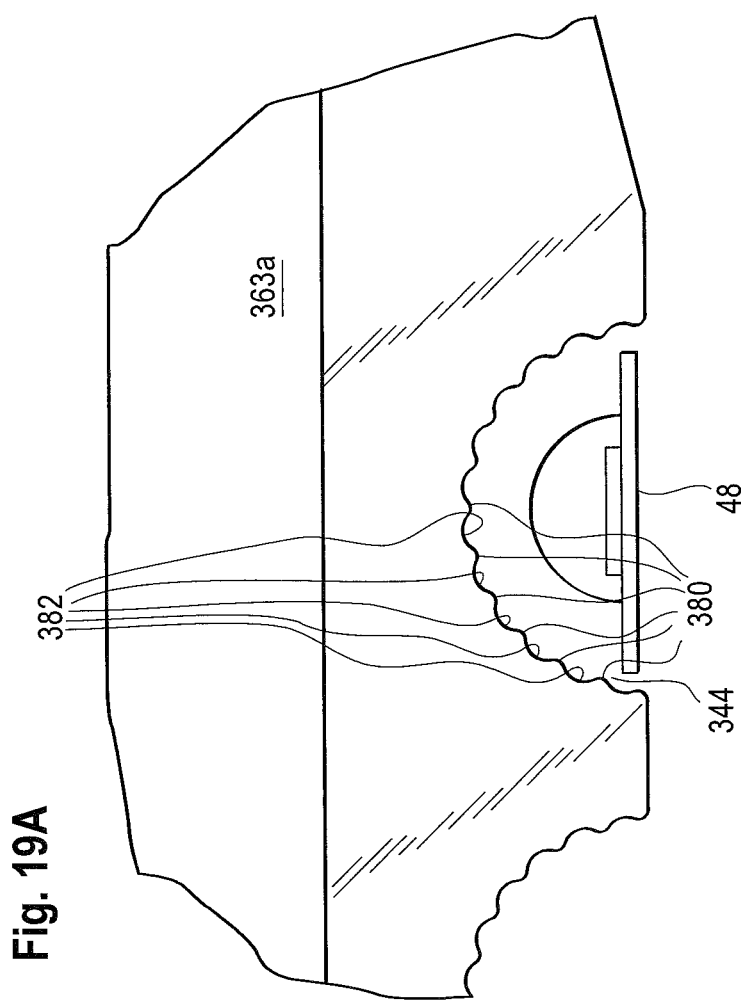

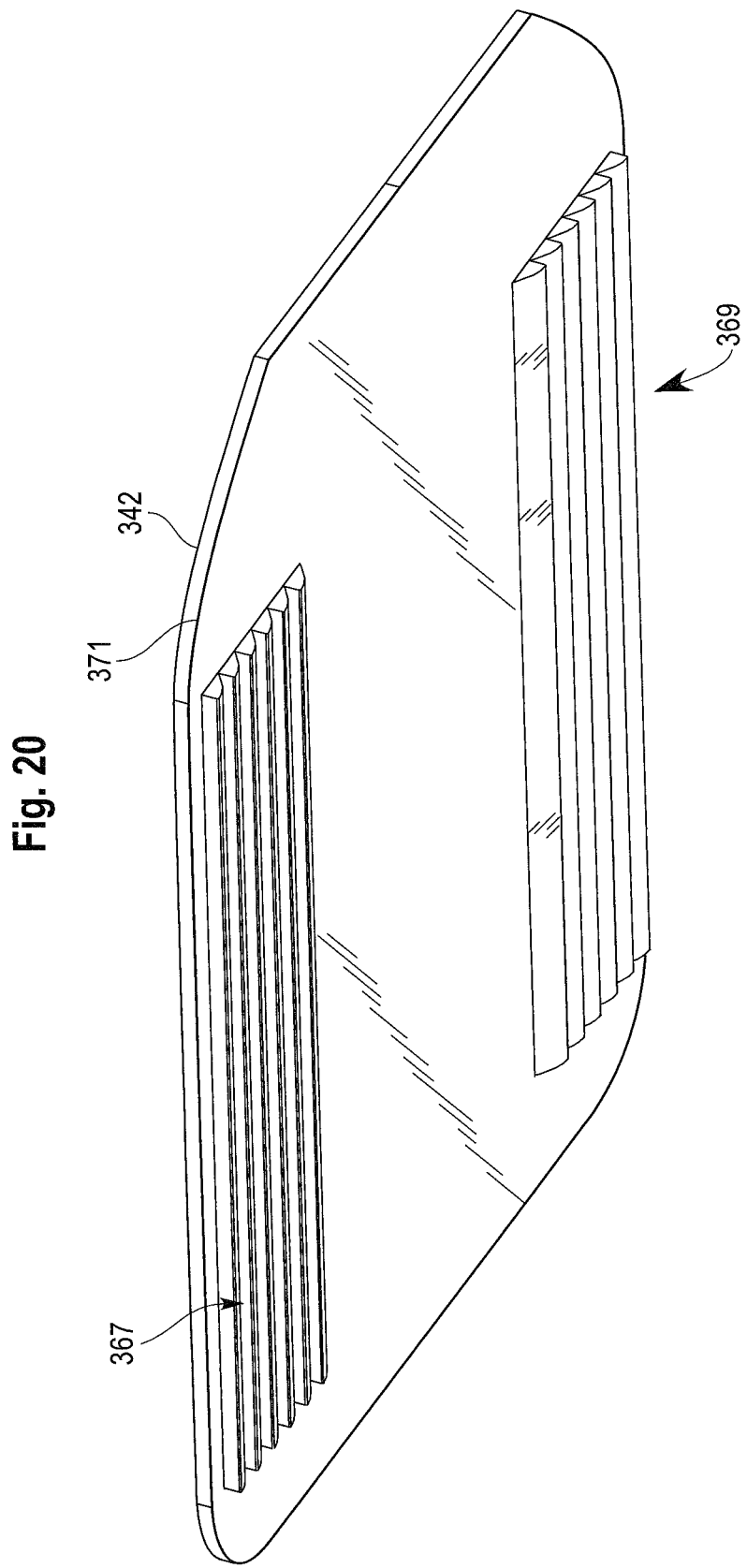

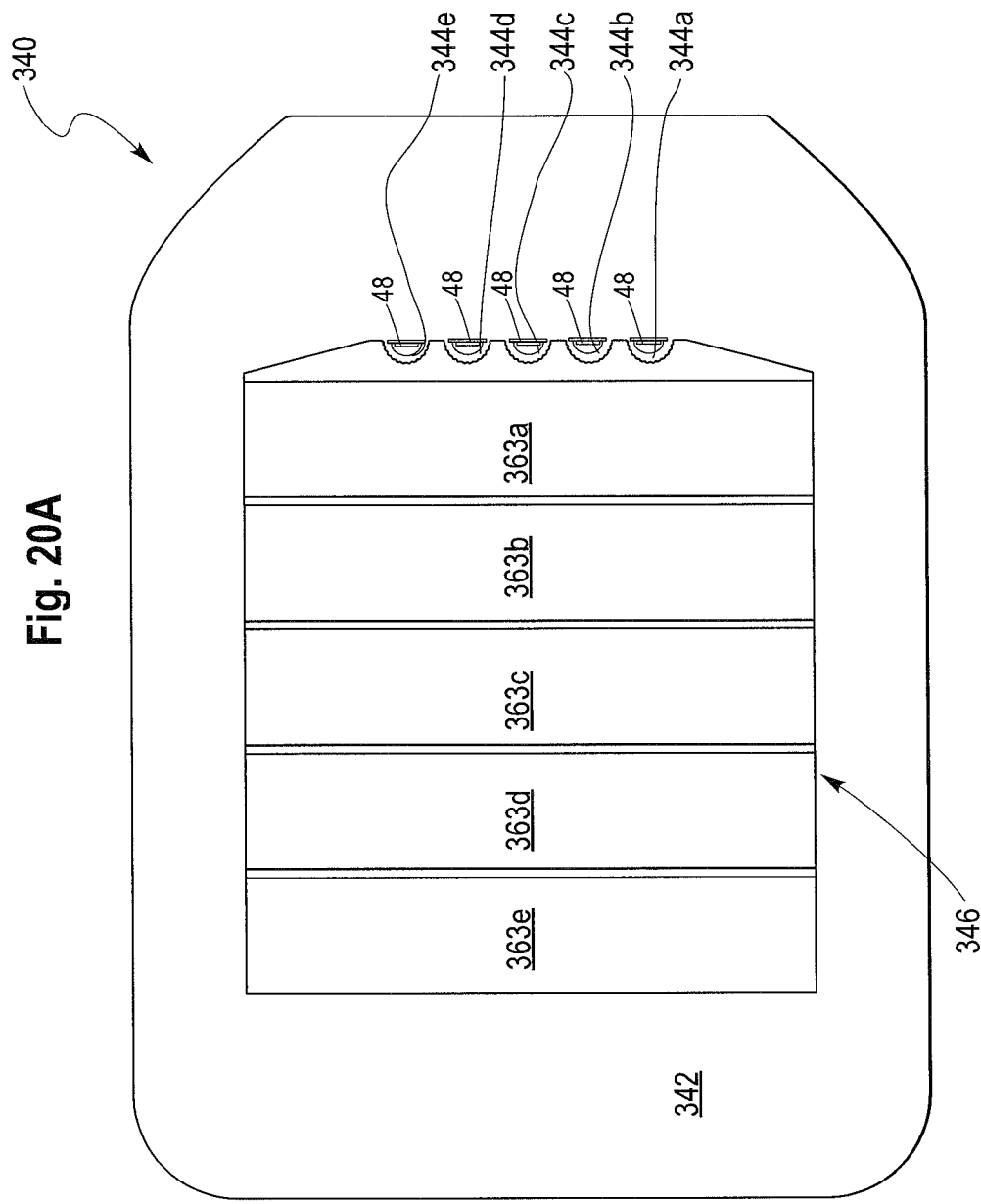

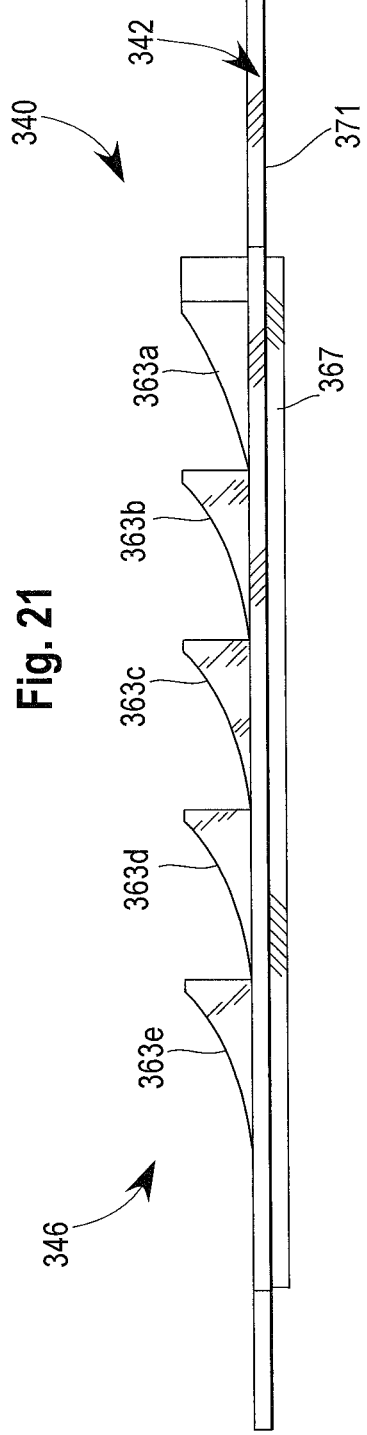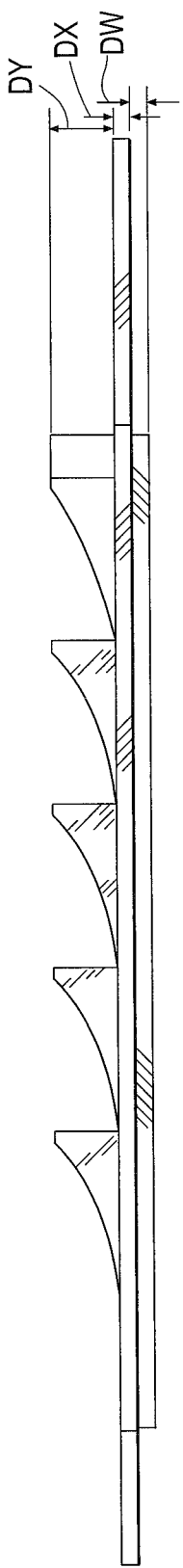

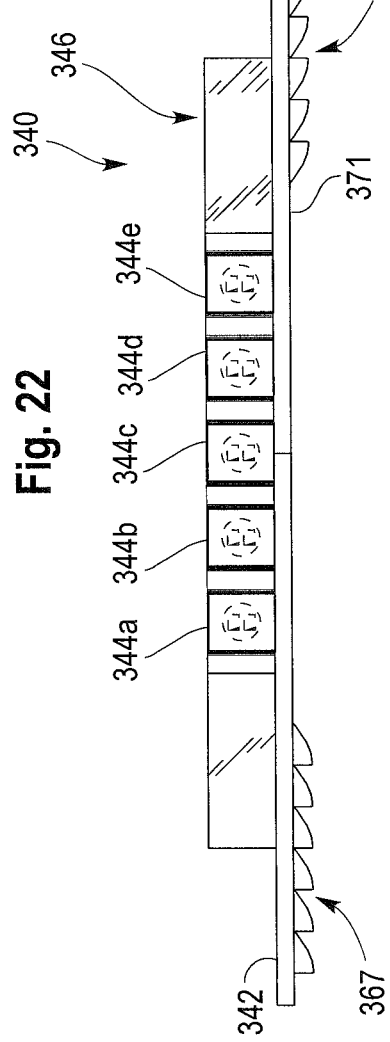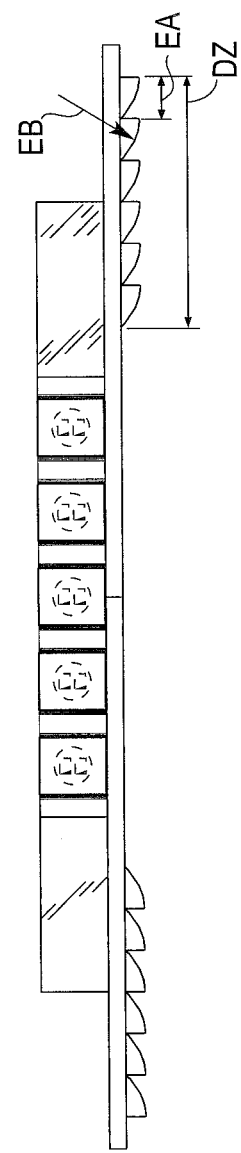

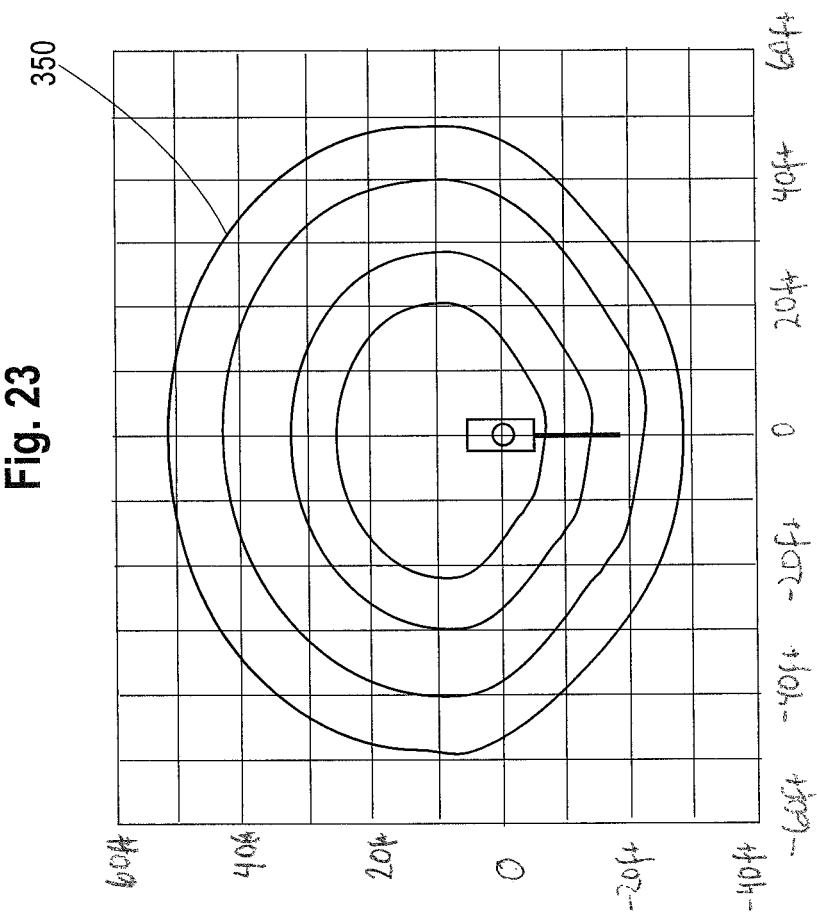

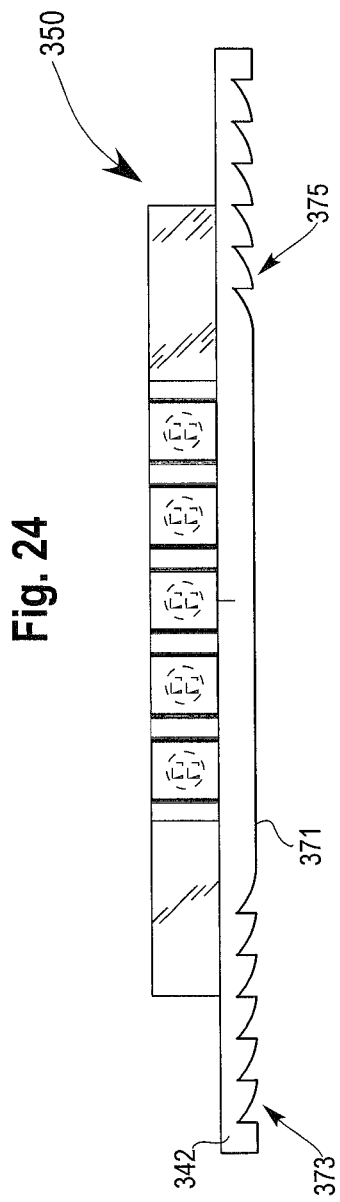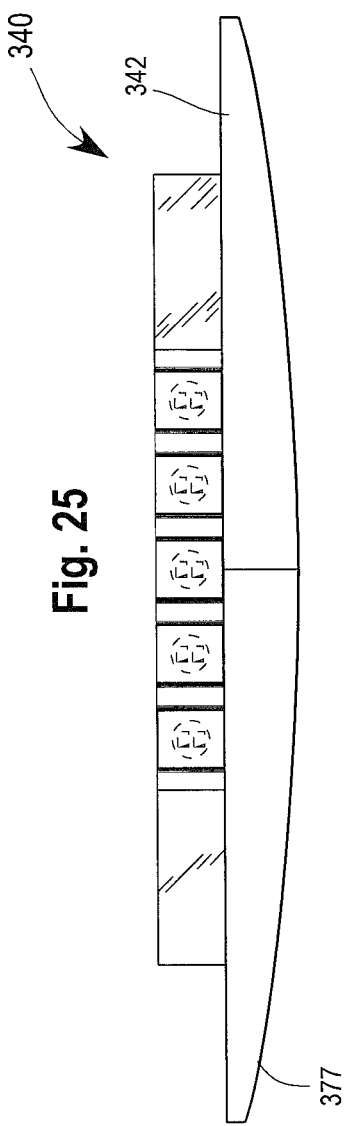

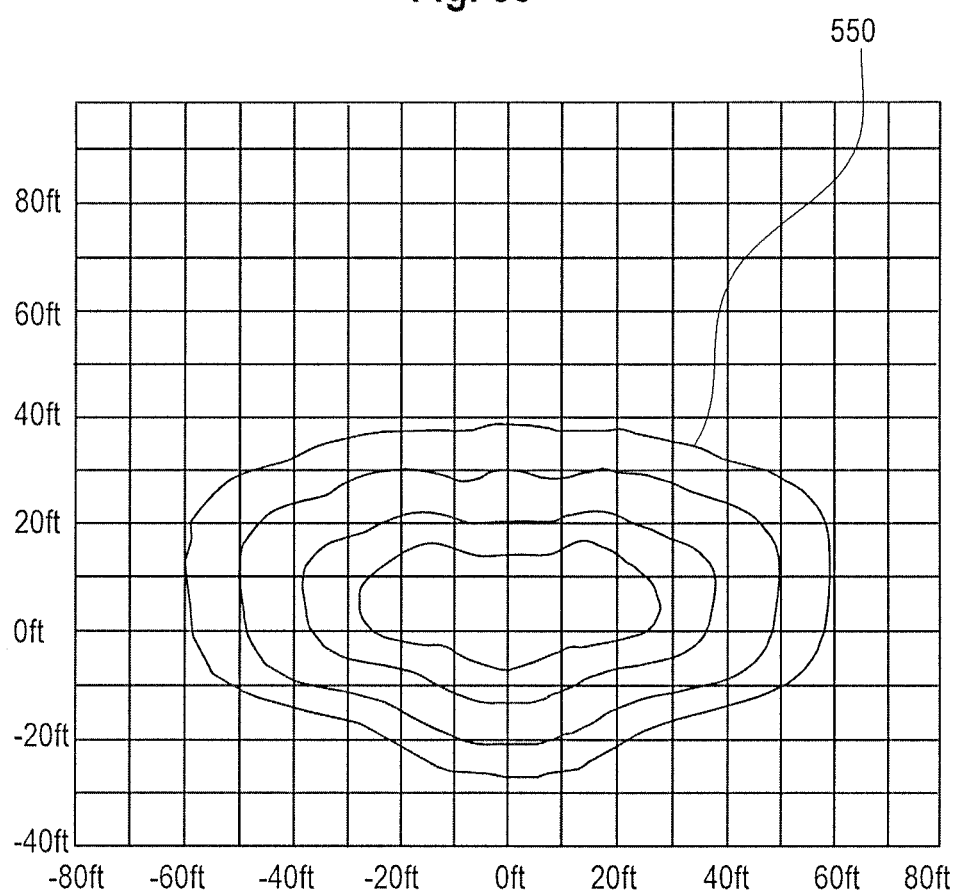

OPTICAL WAVEGUIDE BODY

CROSS REFERENCE TO RELATED APPLICATIONS

The present application claims the benefit of U.S. Provisional Patent Application No. 61/922,017, filed Dec. 30, 2013, entitled "Optical Waveguide Bodies and Luminaires Utilizing Same". The present application further comprises a continuation-in-part of U.S. patent application Ser. No. 13/842,521, filed Mar. 15, 2013, entitled "Optical Waveguides", and further comprises a continuation-in-part of U.S. patent application Ser. No. 13/839,949, filed Mar. 15, 2013, entitled "Optical Waveguide and Lamp Including Same", and further comprises a continuation-in-part of U.S. patent application Ser. No. 13/841,074, filed Mar. 15, 2013, entitled "Optical Waveguide Body", and further comprises a continuation-in-part of U.S. patent application Ser. No. 13/840,563, filed Mar. 15, 2013, entitled "Optical Waveguide and Luminaire Incorporating Same", and further comprises a continuation-in-part of U.S. application Ser. No. 13/841,622, filed Mar. 15, 2013, entitled "Shaped Optical Waveguide Bodies", and further comprises a continuation-in-part of U.S. patent application Ser. No. 13/938,877, filed Jul. 10, 2013, entitled "Optical Waveguide and Luminaire Incorporating Same", and further comprises a continuation-in-part of U.S. patent application Ser. No. 14/015,801, filed Aug. 30, 2013, entitled "Consolidated Troffer", and further comprises a continuation-in-part of U.S. patent application Ser. No. 14/101,086, filed Dec. 9, 2013, entitled "Optical Waveguides and Luminaires Incorporating Same", and further comprises a continuation-in-part of U.S. patent application Ser. No. 14/101,147, filed Dec. 9, 2013, entitled "Luminaires Using Waveguide Bodies and Optical Elements", and further comprises a continuation-in-part of U.S. patent application Ser. No. 14/101,099, filed Dec. 9, 2013, entitled "Optical Waveguide Assembly and Light Engine Including Same", and further comprises a continuation-in-part of U.S. patent application Ser. No. 14/101,129, filed Dec. 9, 2013, entitled "Simplified Low Profile Module With Light Guide For Pendant, Surface Mount, Wall Mount and Stand Alone Luminaires", and further comprises a continuation-in-part of U.S. patent application Ser. No. 14/101,051, filed Dec. 9, 2013, entitled "Optical Waveguide and Lamp Including Same", and further comprises a continuation-in-part of International Application No. PCT/US14/13937, filed Jan. 30, 2014, entitled "Optical Waveguide Bodies and Luminaires Utilizing Same", and further comprises a continuation-in-part of International Application No. PCT/US14/13931, filed Jan. 30, 2014, entitled "Optical Waveguides and Luminaires Incorporating Same", all owned by the assignee of the present application, and the disclosures of which are incorporated by reference herein.

REFERENCE REGARDING FEDERALLY SPONSORED RESEARCH OR DEVELOPMENT

Not applicable.

SEQUENTIAL LISTING

Not applicable

FIELD OF THE INVENTION

The present subject matter relates to optical devices, and more particularly, to an optical waveguide body.

BACKGROUND OF THE INVENTION

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

Smith U.S. Pat. Nos. 7,083,313 and 7,520,650 discloses a light direction device for use with LEDs. In one embodiment, the light direction device includes a plurality of opposing collimators disposed about a plurality of LEDs on one side of the device. Each collimator collimates light developed by the LEDs and directs the collimated light through output surfaces of the collimators toward angled reflectors disposed on a second side opposite the first side of the device. The collimated light reflects off the reflectors out of from the one side perpendicular thereto. In another embodiment, the collimators are integral with a waveguide having reflective surfaces disposed on a second side of the waveguide, and the collimated light is directed toward the reflective surfaces. The light incident on the reflective surfaces is directed from the one side of the device, as in the one embodiment.

In some applications such as roadway, street, or parking lot lighting, it may be desirable to illuminate certain regions surrounding a light fixture while maintaining relatively low illumination of neighboring regions thereof. For example, along a roadway, it may be preferred to direct light in a lateral direction parallel with the roadway while minimizing illumination in a longitudinal direction toward roadside houses.

SUMMARY OF THE INVENTION

According to one aspect, an optical waveguide body includes first and second pluralities of light extraction features disposed on a first side of the waveguide body and adapted to direct light out of the waveguide body through a second side of the waveguide body opposite the first side. Each of the first plurality of light extraction features has a linear shape and each of the second plurality of light extraction features has at least one of a piecewise linear shape and a nonlinear shape. The piecewise linear shape comprises two adjacent planar surfaces with an angle therebetween of at least about 30 degrees and at most about 220 degrees. The waveguide body further has a light coupling cavity.

According to another aspect, an optical waveguide body has a width dimension, a length dimension transverse to the width dimension, and a thickness dimension transverse to the width dimension and length dimension. The waveguide body comprises a light coupling cavity extending in the thickness dimension and a plurality of light extraction features disposed on a first side of the waveguide body and adapted to direct light out of the waveguide body through a second side of the waveguide body opposite the first side. One of the plurality of light extraction features has a linear shape and another of the plurality of light extraction features has at least one of a piecewise linear surface and a nonlinear surface. The piecewise linear surface comprises two adjacent planar surfaces with an angle therebetween of at least about 30 degrees and at most about 220 degrees.

According to a further aspect, a waveguide body has a longitudinal axis and a lateral axis perpendicular to the longitudinal axis. The waveguide body comprises a plurality of light extraction features at least two of which are separated from one another along the longitudinal axis and wherein at least one of the extraction features has a lateral extent, and at least one light coupling cavity adapted to transmit light from a light source into the waveguide body. The extraction features are configured to develop an asymmetric light distribution.

Other aspects and advantages of the present invention will become apparent upon consideration of the following detailed description and the attached drawings wherein like numerals designate like structures throughout the specification.

BRIEF DESCRIPTION OF THE DRAWINGS

FIG. 2A is a plan view identical to FIG. 2 illustrating sample dimensions of the waveguide body of FIG. 1;

FIG. 3 is a side elevational view of the first embodiment of FIG. 1;

FIG. 3A is an enlarged, fragmentary view of a light coupling cavity of the waveguide body of FIG. 1;

FIG. 4 is a sectional view taken generally along the lines 4-4 of FIG. 1;

FIG. 5 is an end elevational view of the first embodiment of FIG. 1;

FIG. 5A is a graph illustrating an illumination pattern developed by the first embodiment of FIG. 1;

FIG. 5C is an elevational view of an LED element used in the waveguide body of FIG. 1;

FIG. 6 is an isometric view of a second embodiment of a waveguide body;

FIG. 8 is a side elevational view of the second embodiment of FIG. 6;

FIG. 8A is a side elevational view identical to FIG. 8 illustrating sample dimensions of the waveguide body of FIG. 6;

FIG. 9 is an end elevational view of the second embodiment of FIG. 6;

FIG. 9A is an end elevational view identical to FIG. 9 illustrating sample dimensions of the waveguide body of FIG. 6;

FIGS. 12-18 are sectional views generally taken along the lines 12-12, 13-13, 14-14, 15-15, 16-16, 17-17, and 18-18, respectively, of FIG. 10;

FIG. 19A is an enlarged, fragmentary view of the light coupling cavity of the waveguide body of FIG. 19;

FIG. 20 is an isometric view from below of the fourth embodiment of FIG. 19;

FIG. 20A is a plan view of the fourth embodiment of FIG. 19;

FIG. 21 is a side elevational view of the fourth embodiment of FIG. 19;

FIG. 21A is a side elevational view identical to FIG. 21A illustrating sample dimensions of the waveguide body of FIG. 19;

FIG. 22 is an end elevational view of the fourth embodiment of FIG. 19; and

FIG. 22A is an end elevational view identical to FIG. 22A illustrating sample dimensions of the waveguide body of FIG. 19;

FIG. 23 is a graph illustrating an illumination pattern developed by the fourth embodiment of FIG. 19;

FIG. 24 is an end elevational view illustrating an alternative embodiment of the substrate of FIG. 19;

FIG. 25 is an end elevational view illustrating a further alternative embodiment of the substrate of FIG. 19;

FIG. 33 is a graph illustrating an illumination pattern developed by the sixth embodiment of FIG. 27.

DETAILED DESCRIPTION OF THE PREFERRED EMBODIMENTS

Figure 1:
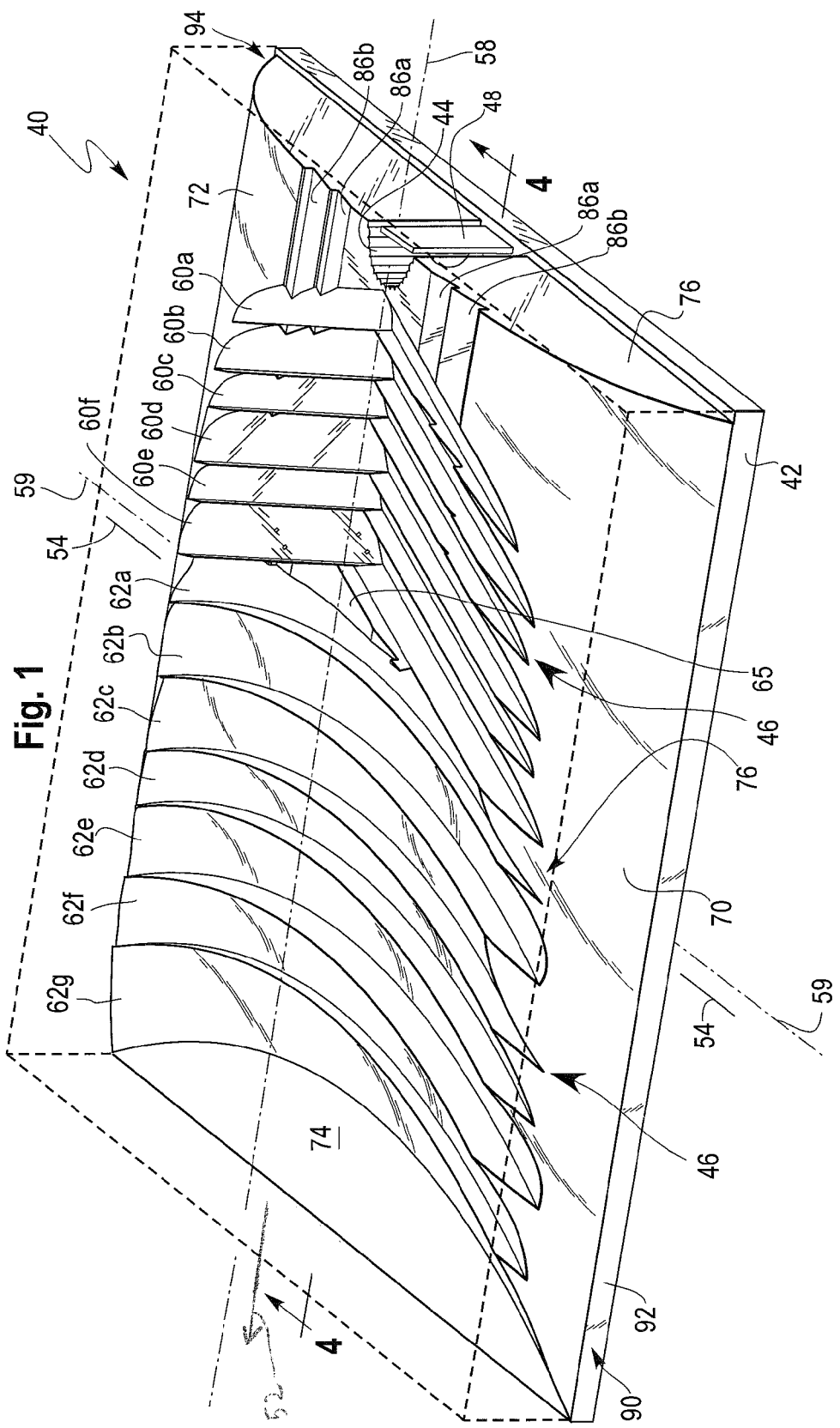
FIG. 1 is an isometric view of a first embodiment of a waveguide body.
Figure 2:
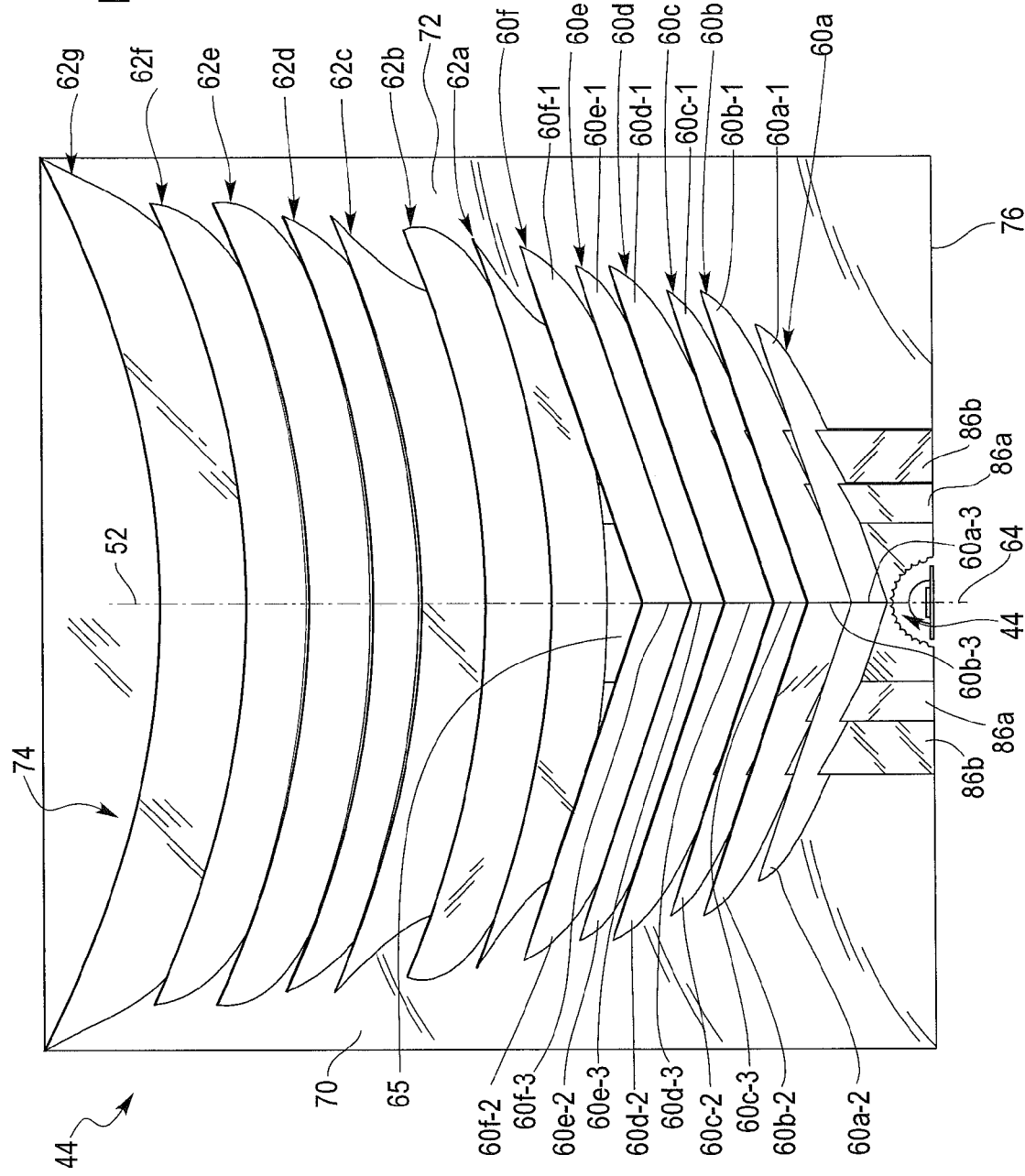
FIG. 2 is a plan view of the first embodiment of FIG. 1.

Referring to FIGS. 1-5, a first embodiment of a waveguide body or optic 40 is shown. It should be noted that identical reference numerals connote identical structures throughout the various embodiments. The waveguide body 40, as well as other embodiments disclosed herein, are particularly adapted for use in general lighting applications, for example, in an outdoor roadway or parking lot luminaire, or in any other indoor or outdoor luminaire. The waveguide body 40 is made of suitable optical materials, as noted in greater detail hereinafter, and includes a base plate or substrate 42, at least one light coupling cavity 44, and a number of light redirection elements 46. The substrate 42' may be integral with the redirection elements 46' as shown in the waveguide body 40' of FIG. 5B or the redirection elements 46 may be separately formed on the substrate 42 as shown in the waveguide body 40 of FIG. 1, as desired. The substrate 42 and some or all of the redirection elements may be made of the same or different materials as noted in greater detail below. The at least one light coupling cavity 44 is adapted to receive at least one LED element or module 48 each described in greater detail hereinafter. If multiple LED elements 48 are used, such elements may be stacked in (see FIG. 6) or adjacent the light coupling cavity 44 along the thickness dimension of the waveguide body 40. Still further, some LED elements 48 may be distributed in side-by-side relationship along the length and width dimensions of the waveguide body 40 transverse to the thickness dimension or the LED elements 48 may be disposed in some other arrangement relative to one another and relative to the light coupling cavity. The LED elements 48 may be mounted on individual support structures or multiple elements may be mounted on a single support structure (see FIG. 6). Each LED element 48 receives power from a power supply of suitable type. The waveguide body 40, and, in particular, the light redirection elements 46, direct light developed by the LED element(s) 48 through the substrate 42 toward a desired illumination target surface, such as a roadway, with one of two illumination patterns 50a and 50b, for example, as seen in FIG. 5A. The illumination patterns 50a, 50b provided in FIG. 5A are produced by a luminaire including the waveguide body 40. The luminaire is located at the center (0, 0) of the graph and has a mounting height of 20 feet. The illumination pattern 50a results from molding of the waveguide body 40 using a mold having polished surfaces whereas the illumination pattern 50b results from production by a mold having unpolished surfaces. The illumination patterns 50 are preferably, although not necessarily, offset with respect to a center 54 of the waveguide body 40 seen in FIG. 1. Specifically, the illumination area is disposed away from the center 54 in the direction of the arrow 52 of FIG. 1, with the magnitude of the offset and the size and, possibly, the shapes of the illumination area being a function of distance of the luminaire from the target surface, as should be evident.

The waveguide body 40 includes a longitudinal axis 58 extending from the light coupling cavity 44 to an end surface 74 and a lateral axis 59 perpendicular to the longitudinal axis 58. The number of light redirection elements 46 includes at least first and second pluralities of light extraction features 60, 62. Each of the light extraction features 60 is linear in shape preferably, although not necessarily, having a length component parallel to the lateral axis 59, while each of the light extraction features 62 is nonlinear in shape. More specifically, the first plurality of light extraction features 60 includes six linear light extraction features 60a-60f. Each of the light extraction features 60, for example, the feature 60a, includes two linear portions 60a-1 and 60a-2 that meet at an apex 60a-3 to form a chevron shape. The apex 60a-3 is aligned with other apexes 60b-3 through 60f-3 and all the apexes are coincident with a centerline 64 of the light coupling cavity 44 coincident with the longitudinal axis 58. The light coupling cavity 44 is preferably, although not necessarily, symmetric with respect to the centerline 64. Referring to FIG. 5A, the extraction features 60, 62 are configured to develop an asymmetric light distribution 50A, 50B (asymmetric in the sense that the distribution is not symmetric about a line, axis, or other geometric shape) having a lateral extent offset from the lateral axis 59 greater than a longitudinal extent aligned with the longitudinal axis 58.

In the illustrated embodiment, the second plurality of light extraction features 62 includes features 62a-62g and each feature 62 has a curved or piecewise linear shape, preferably approximating a curve. Preferably, although not necessarily, the curved shapes of the features 62a-62g are centered with respect to the centerline 64. Extraction features 62a and 62c include convex curved surfaces 62a-1 and 62c-1, respectively, while extraction features 62b, 62d, 62e, and 62f include concave curved surfaces 62b-1, 62d-1, 62e-1, and 62f-1, respectively. A transition portion 65 may be disposed between the first and second pluralities of features 60, 62. Further, as seen in FIGS. 1 and 3-5, outer side surfaces 70, 72 are preferably curved or otherwise tapered to promote light extraction during a single pass of light through the waveguide body 40.

Also preferably, the light coupling cavity 44 and the LED element(s) 48 are disposed at an additional end surface 76. As shown in the FIGS., the coupling cavity 44 may extend fully through the body 40, although the coupling cavity 44 (or one or more coupling cavities) may extend only partially through the body 40. It should be noted that the LED element(s) 48 need not be located at an edge portion of the waveguide body 40 (which embodiments are referred to as "edge lit"). Rather, the coupling cavity 44 may be a blind cavity or through bore of any suitable shape disposed at a location intermediate the side surfaces 70, 72 and the end surfaces 74, 76 and the LED element(s) 48 may be disposed in the blind cavity or through bore to obtain an "interior lit" waveguide. In edge lit embodiments, the LED element(s) 48 may be above, below, and/or to the side of the edge and aligned therewith as shown and described in co-pending U.S. patent application Ser. No. 14/101,086, entitled "Optical Waveguides and Luminaires Incorporating Same," filed Dec. 9, 2013. A reflecting cover or member may be disposed over, under, or otherwise adjacent to the LED element(s) 48 in any of the embodiments disclosed herein. In other embodiments, the LED element(s) 48 may be disposed adjacent an elongate coupling section. In some embodiments, for example, as shown below, the waveguide body may include more than one coupling cavity. Such a waveguide body may be interior lit and/or edge lit, and/or include one or more elongate coupling cavities, as desired. Further, it may be desirable to dispose the LED element(s) 48 at an angle α within the coupling cavity as shown in FIGS. 6 and 7 For example, where the LED element(s) 48 extends into the waveguide body from an edge thereof as shown in FIG. 7, the central axis of the LED element(s) 48 may be disposed at a non-zero angle with respect to the length, width, and/or thickness dimensions of the waveguide body 40.

A light diverter may be disposed in the blind cavity or through bore to direct light into the waveguide body 40 as disclosed in U.S. patent application Ser. No. 13/839,949, filed Mar. 15, 2013, entitled "Optical Waveguide and Lamp Including Same" incorporated by reference herein.

Further in the illustrated embodiment, the light coupling cavity 44 has a semicircular cross-sectional cylindrical shape including protrusions 80 separated by intervening depressions 82. As seen in FIG. 3A, the protrusions 80 are relatively rounded (i.e., each has a relatively large radius of curvature) and the depressions are relatively sharp (i.e., each has a relatively small radius of curvature). The protrusions and depressions promote color mixing in the event that LED element(s) 48 of different colors are used and/or promote luminance uniformity in the waveguide body 40 regardless of whether multi-color or monochromatic LED element(s) 48 are used. It should be noted that the light coupling cavity 44 may be of any other suitable shape, such as the shapes disclosed hereinafter, if desired.

Still further in the illustrated embodiment, a third plurality of light extraction elements 86 is disposed transversely with respect to the first and second pluralities of light extraction features 60, 62. The third plurality of light extraction elements 86 includes light extraction features 86a, 86b.

The spacing, number, size, and geometry of extraction features 60, 62, and 86 determine the mixing and distribution of light in the waveguide body 40 and light exiting therefrom. In the illustrated embodiment, the extraction features 60, 62, and 86 comprise a series of ridges separated by intervening troughs at least some of which define one or more inverted V-shapes in cross section, as seen in the FIGS. Also in the illustrated embodiment, one (and perhaps more) of the extraction features of the pluralities 60, 62, and 86 is continuous (i.e., it extends in a continuous manner), while the remaining extraction features of the pluralities comprise continuous or discontinuous ridges (i.e., partial linear and/or nonlinear features extending continuously or discontinuously) separated by intervening troughs. If desired, inflections or other surface features may be provided in any of the extraction features. Still further in the illustrated embodiment all of the extraction features 60, 62, 86 are symmetric with respect to the centerline 64 of the coupling cavity 44 and the centerline 52 of the body 40 coincident therewith. In addition to the foregoing, the waveguide body 40 is tapered in an overall sense from the coupling cavity 44 to an extraction feature 62g in that there is less material at the general location of the extraction feature 62g than at portions adjacent the coupling cavity 44. Such tapering may be effectuated by providing extraction features that become deeper and/or are more widely separated with distance from the coupling cavity 44. The tapering maximizes the possibility that substantially all the light introduced into the waveguide body 40 is extracted over a single pass of the light therethrough. This results in substantially all of the light striking the outward surfaces of the extraction features 60, 62, 86, which are carefully controlled so that the extraction of light is also carefully controlled. The combination of tapering with the arrangement of extraction features result in improved color mixing with minimum waveguide thickness and excellent control over the emitted light.

It should be noted that any or all of the first through third pluralities 60, 62, 86 may include a different number of light extraction features, as desired. In any event, the lambertian or other distribution of light developed by the LED element(s) 48 is converted into a distribution resulting in the illumination patterns 50. More specifically, the light developed by the LED element(s) 48 is emitted into center portions of the beam spread and to side portions past imaginary planar surfaces normal to a lower surface 90 and coincident with side margins 92, 94 of the substrate 42. This lateral extent of the beam spread is substantially greater than a longitudinal extent of the beam spread of the light (i.e., the beam spread transverse to the lateral extent) of the illumination pattern 50. The illumination pattern can be modified through appropriate modification of the light extraction elements. The brightness can be increased or decreased by adding or omitting, respectively, LED elements 48.

Each LED element 48 may be a single white or other color LED, or each may comprise multiple LEDs either mounted separately or together on a single substrate or package to form a module including, for example, at least one phosphor-coated LED either alone or in combination with at least one color LED, such as a green LED, a yellow LED, a red LED, etc. In those cases where a soft white illumination is to be produced, each LED module 48 typically includes one or more blue shifted yellow LEDs and one or more red LEDs. Referring to FIG. 5C, the illustrated LED element 48 of waveguide body 40 comprises six blue-shifted yellow LEDs 96a-96f disposed in two rows of three LEDs located adjacent the edges or sides 98a, 98c. Three red LEDs 100a-100c are disposed in a single row between the two rows of blue-shifted LEDs 96. Each red LED 100 has a height that is less than a height of the surrounding blue-shifted yellow LEDs 96. The light emitted from the red LED 100, therefore, is obstructed at least in part by the blue-shifted yellow LED 96, such that the light emanating from the LED element 48 is not uniform. In addition to height differences, differences in the nature of the red and blue-shifted yellow LEDs 96, 100 affect the way the light is emitted from the respective LED. The LEDs 96 and 100 may be disposed in different configurations and/or layouts as desired. Different color temperatures and appearances could be produced using other LED combinations, as is known in the art. In one embodiment, the light source comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized inside the waveguide body. In some embodiments, each LED element 48 may comprise one or more LEDs disposed vertically within the coupling cavity. In any of the embodiments disclosed herein the LED element(s) 48 preferably have a lambertian light distribution, although each may have a directional emission distribution (e.g., a side emitting distribution), as necessary or desirable. More generally, any lambertian, symmetric, wide angle, preferential-sided, or asymmetric beam pattern LED(s) may be used as the light source.

If desired, in any of the embodiments disclosed herein, a reflecting backplane member 56 may be provided behind the waveguide body 40 opposite the substrate 42 and/or one or more of the surfaces of the waveguide body may be coated/covered with a reflective material, such as a specular reflective material or film or a white material or film. Light that escapes a surface 98 of the waveguide body opposite the substrate 42 (or other base surface) is thus reflected back into the waveguide body 40 so that light is efficiently extracted out the substrate 42. The backplane member 56 may have other than a planar base surface, such as a curved surface.

In the illustrated embodiment, the light emitted out the waveguide body 40 is mixed such that point sources of light in the LED elements 48 are not visible to a significant extent and the emitted light is controlled and collimated to a high degree.

Referring next to FIGS. 6-9, a further embodiment of a waveguide body 140 includes at least one light coupling cavity 44, and a number of light redirection elements 146. Although not shown, the waveguide body 140 may include a planar substrate, similar or identical to the substrate 42, if desired, or the substrate may simply comprise a bottom surface 145 of the waveguide body 140 as shown. As shown in FIGS. 6 and 7, four LED elements 48 are disposed in or adjacent the light coupling cavity 44, as previously described. Two sets of stacked LED elements 48 are disposed at an angle α with respect to the width dimension of the waveguide body 140.

The number of light redirection elements includes first and second pluralities of light extraction features 160, 162. The light extraction features 160 are linear in overall side-to-side extent or shape and include three wedge-shaped (in cross-section) extraction features 160a-160c. The light extraction features 162 comprise features 162a-162j each of which is bounded by at least one portion that is either curved (as illustrated) or piecewise linear in shape preferably approximating a curve. In the latter event, each piecewise linear shape comprises at least two planar surfaces with an included angle therebetween of about 40 degrees and about 220 degrees, and, more preferably between about 60 degrees and about 180 degrees, and most preferably between about 80 degrees and about 150 degrees. Each of the light extraction features 162 is also wedge-shaped in cross-section. A transition element 164 is disposed between the features 160 and 162.

The light extraction features 160 assist in spreading light along both of the longitudinal and lateral directions 58, 59 whereas the extraction features 162 assist in spreading light in primarily in the lateral direction 59. Still further in the illustrated embodiment all of the extraction features 160, 162, are symmetric with respect to the centerline 64 of the coupling cavity 44 and the centerline 52 of the body 140 coincident therewith. In addition to the foregoing, the waveguide body 140 is tapered in an overall sense from the coupling cavity 44 to outer sides thereof in that there is less material at the outside edges of the waveguide body 140 than at portions thereof adjacent the coupling cavity 44. Such tapering may be effectuated by providing extraction features that become deeper and/or are more widely separated with distance from the coupling cavity 44. As in the previous embodiment, such tapering promotes light extraction during a single pass of light through the waveguide 40.

The waveguide body 140, like the other embodiments disclosed herein, develops an illumination pattern suitable for the uses described herein.

Referring to FIGS. 10-18, a further embodiment of a waveguide body 240 includes a plurality of light coupling cavities 244a-244e each of which may be like or differently shaped than the coupling cavity 44 and a number of light redirection elements 246. As in the previous embodiment, and although not shown, the waveguide body 240 may include a planar substrate, similar or identical to the substrate 42, if desired, or the substrate may simply comprise a bottom surface 245 of the waveguide body 240. One or more LED element(s) 48 as disclosed in connection with the first embodiment may be disposed in or adjacent each light coupling cavity 244, as previously described.

Figure 11:
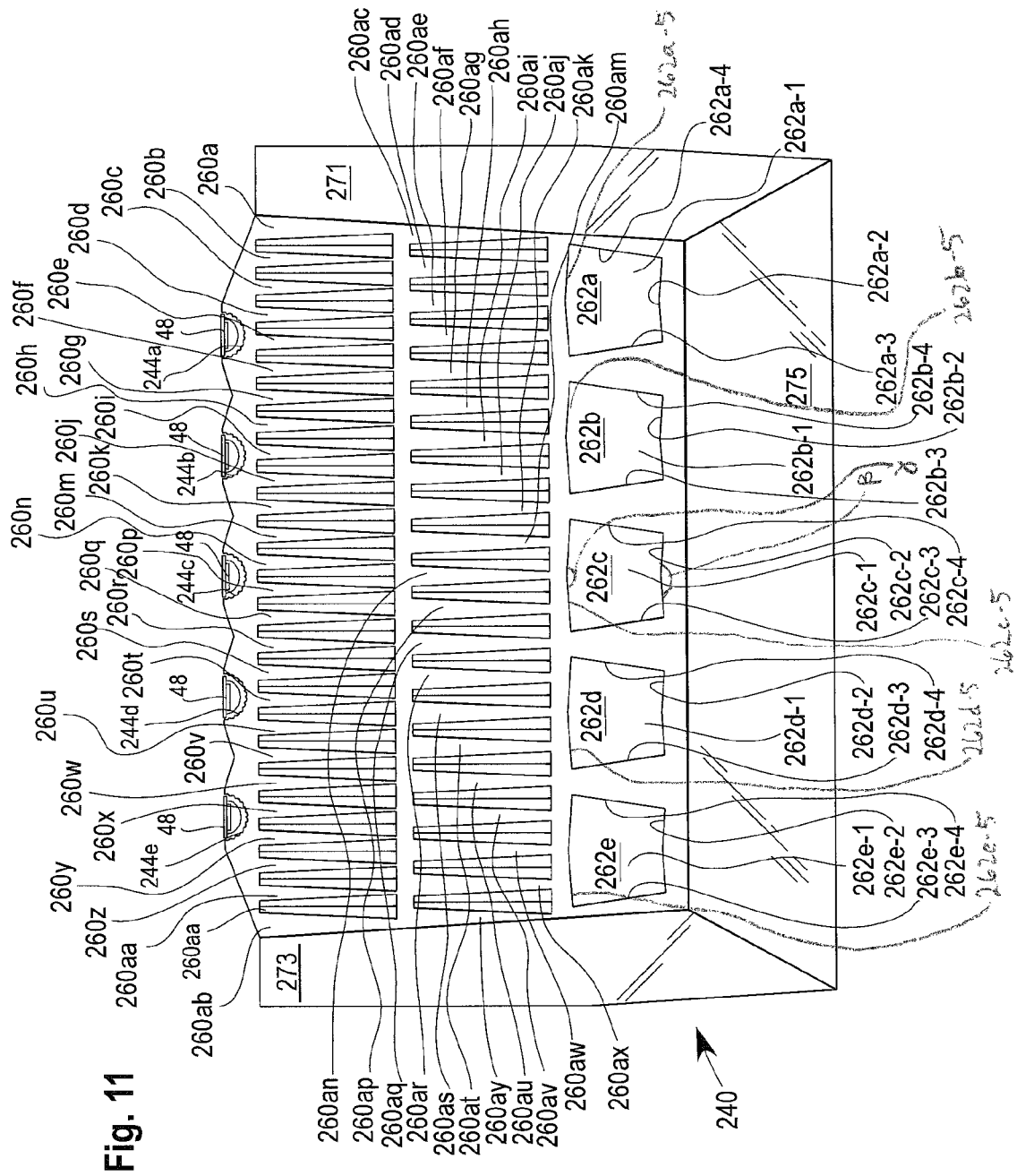
FIG. 11 is a plan view of the third embodiment of FIG. 10.
Figure 12:
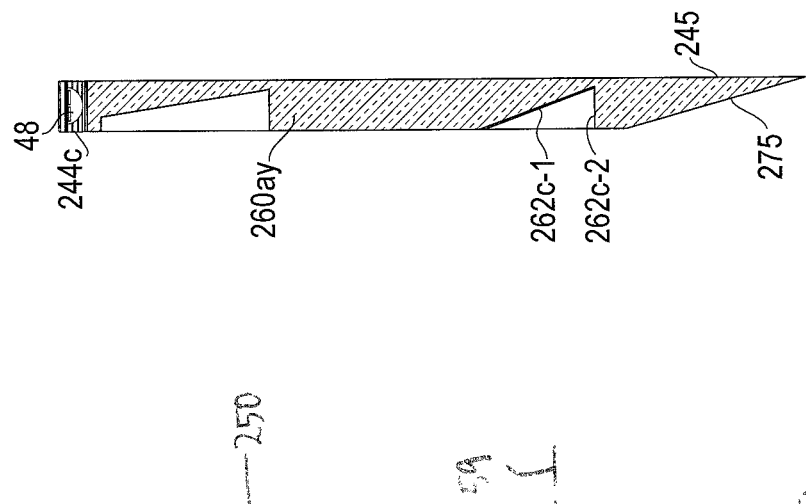

The number of light redirection elements includes first and second pluralities of light extraction features 260, 262 arranged in three rows across the width of the waveguide body 240. The light extraction features 260 are disposed in a first row of features 260a-260ab adjacent the light coupling cavities 244 and a second row of features 260ac-260ay adjacent the first row. The features 260a-260aa are smaller and disposed at a first pitch spacing relative to one another and the features 260ab-260aw are relatively larger and disposed at a second pitch spacing relative to one another larger than the first pitch spacing. Each of the light extraction features 260 is linear in overall end-to-end extent or shape and each is quadrilateral-shaped in cross-section. The light extraction features 262 are disposed in a third row adjacent the second row and comprise features 262a-262e that are bounded by at least one portion that is either curved or, as illustrated, piecewise linear in shape, preferably approximating a curve. For example, adjacent pairs of the base portions 262a-1 through 262e-1 in FIG. 18 are disposed at an angle θ that is preferably equal to or greater than about 140 degrees, more preferably equal to or greater than about 160 degrees, and most preferably equal to or greater than about 180 degrees. End portions 262a-2 through 262e-2 and surfaces 262a-5 through 262e-5 shown in FIG. 11 are disposed at angles β and γ, respectively, that are between about 30 and about 220 degrees, preferably between about 60 and about 180 degrees, and most preferably between about 90 and about 160 degrees. Side portions 262a-3, 262a-4, 262b-3, 262b-4, . . . , 262e-3 and 262e-4 are illustrated as planar, but may be nonlinear or piecewise linear in shape, as necessary or desirable. In any event, each piecewise linear shape comprises at least two planar surfaces with an included angle therebetween as specified hereinabove.

The light extraction features 260 assist in spreading light primarily along the longitudinal axis 59 whereas the extraction features 262 assist in spreading light in both of the longitudinal and lateral axes 58, 59. Still further in the illustrated embodiment the extraction features 260 in the second row and the extraction features 262 are symmetric with respect to a centerline 264 of the waveguide body 240. In addition to the foregoing, the waveguide body 240 is tapered in an overall sense from the coupling cavities 244 to outer sides thereof in that there is less material at the outside edges of the waveguide body 240 than at portions thereof adjacent the coupling cavities 244. Such tapering may be effectuated by providing extraction features that become deeper and/or are more widely separated with distance from the coupling cavities 244 and/or by providing tapered surfaces 271, 273, and 275 at outer portions of the waveguide body 240. As in the previous embodiments, such tapering promotes light extraction during a single pass of light through the waveguide body 240.

Figure 11A:
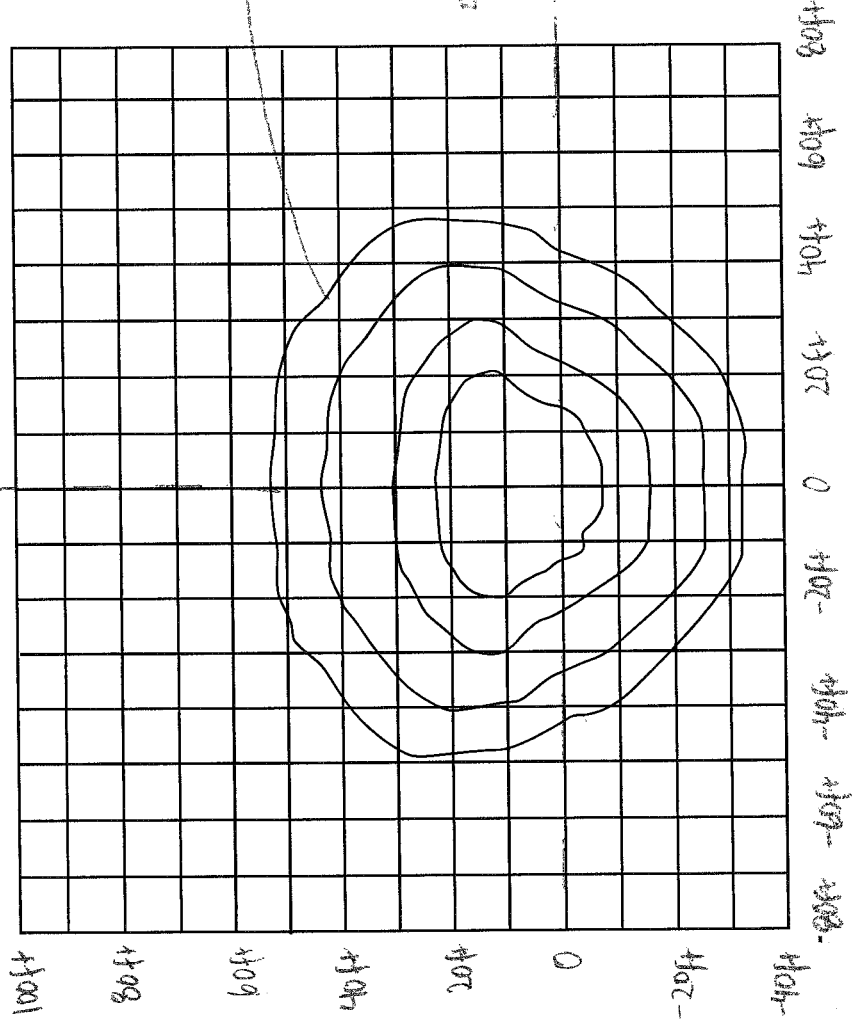
FIG. 11A is a graph illustrating an illumination pattern developed by the third embodiment of FIG. 10.
Figure 13:
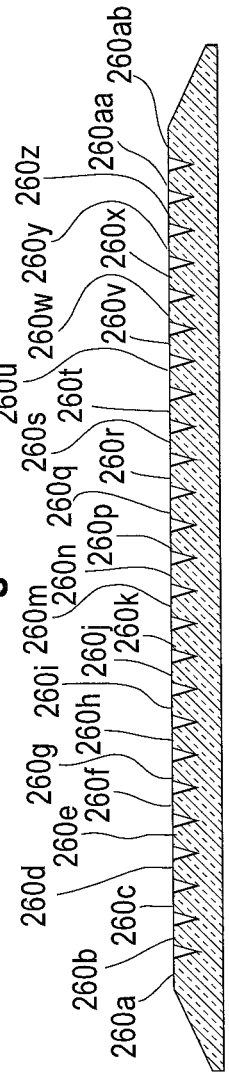
Figure 14:
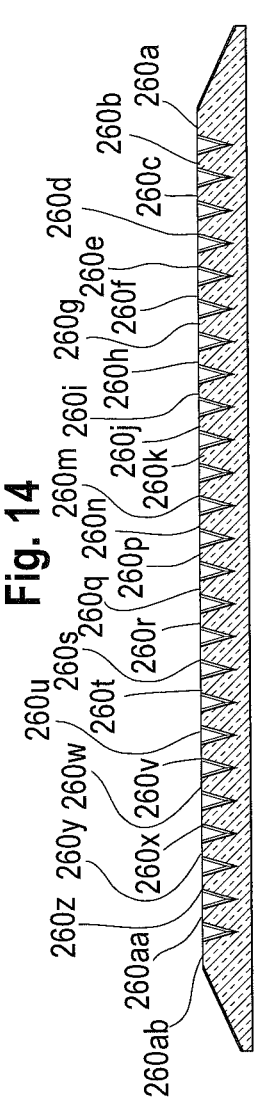
Figure 15:
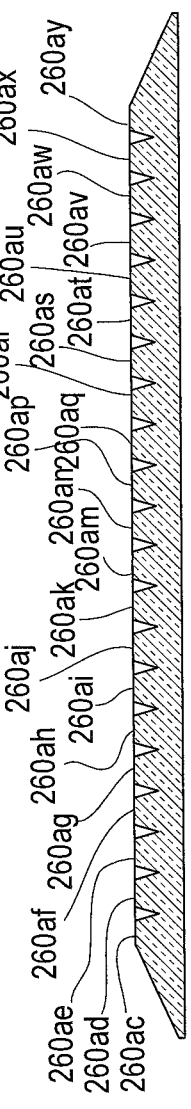
Figure 16:
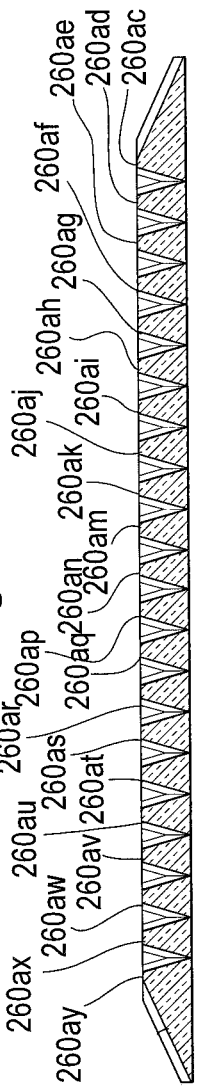
Figure 19:
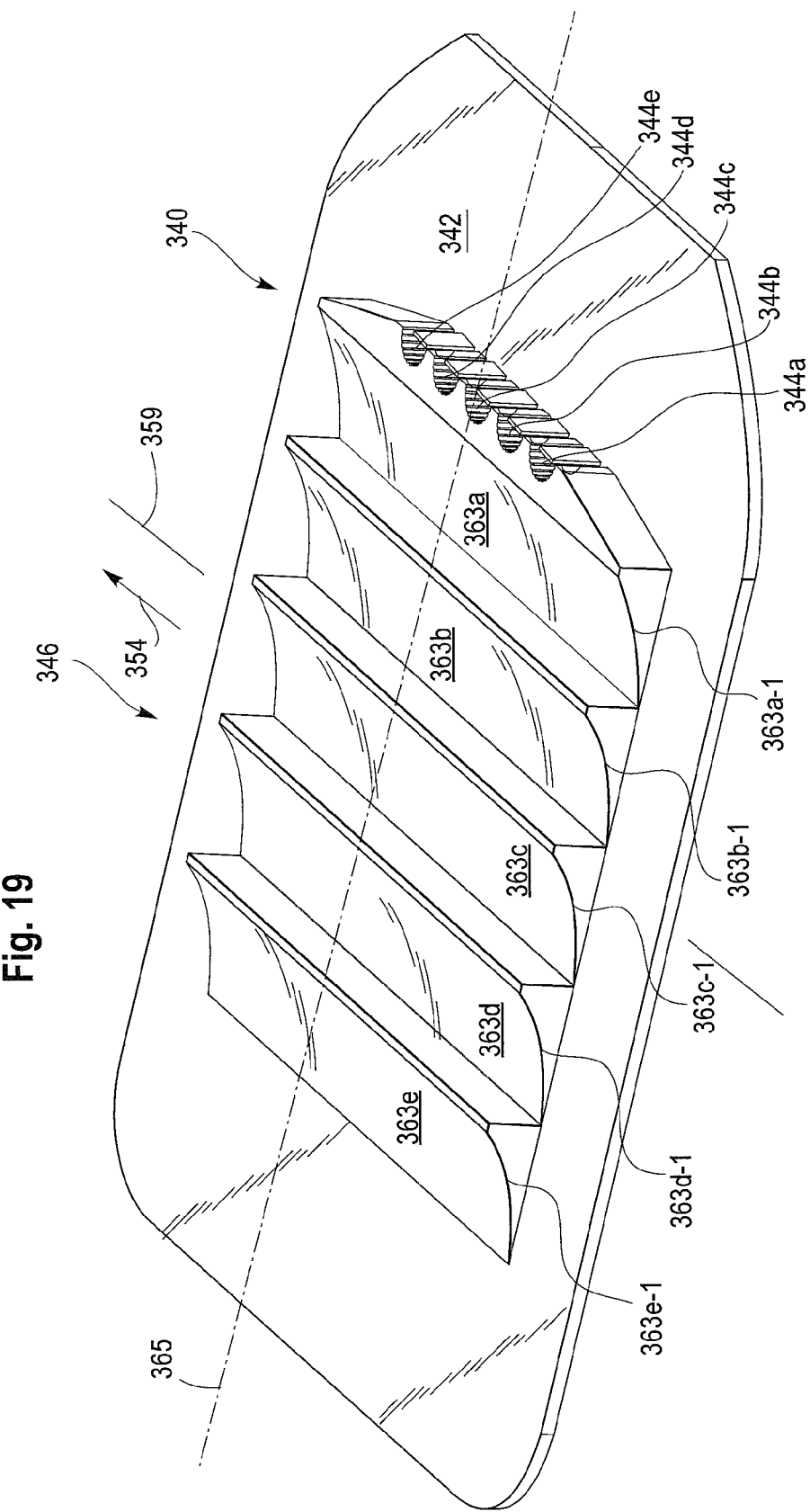
FIG. 19 is an isometric view from above of a fourth embodiment of a waveguide body.

The waveguide body 240, like the other embodiments disclosed herein, develops an illumination pattern suitable for the uses described herein. Under some circumstances, the waveguide body 240 may produce an illumination pattern 250 having a lateral extent along the lateral axis 59 that is greater than a longitudinal extent along the longitudinal axis 58 as shown in FIG. 11A.

FIGS. 19-26 illustrate a still further embodiment of a waveguide body 340. The waveguide body 340 includes a base plate or substrate 342, a plurality of light coupling cavities 344a-344e, and a number of light redirection elements 346. The substrate 342 may be integral with the redirection elements 346 or the redirection elements may be separately formed on the substrate 342, as desired. The substrate 342 and some or all of the redirection elements may be made of the same or different materials. One or more LED element(s) 48 as disclosed in connection with the first embodiment may be disposed in or adjacent each light coupling cavity 344, as previously described.

Further in the illustrated embodiment, the light coupling cavity 344 has a semicircular cross-sectional cylindrical shape including protrusions 380 separated by intervening depressions 382. As seen in FIG. 19A, the protrusions 380 are relatively sharp (i.e., each has a relatively small radius of curvature) and the depressions are relatively rounded (i.e., each has a relatively large radius of curvature), unlike the embodiment of FIGS. 1-5. The protrusions and depressions 380, 382, respectively, promote color mixing in the event that LED element(s) 48 of different colors are used and/or promote luminance uniformity in the waveguide body 340 regardless of whether multi-color or monochromatic LED element(s) 48 are used.

The number of light redirection elements 346 includes at least a plurality of light extraction features 363a-363e. Each of the light extraction features 363 is linear in shape (i.e., lateral extent in the direction of the lateral axis 59) and at least some of the light extraction features 363 includes a nonlinear (e.g., curved) tapered surface 363a-1, 363b-1, . . . , 363e-1. In some embodiments, the surface 363-1 may be a compound surface having a linear portion and a curved portion. In other embodiments, the surface 363-1 may form a convex surface. Further, the light extraction features are preferably symmetric with respect to a centerline 365 of the waveguide body 340, although other configurations are envisioned. In other embodiments, the width, length, and curvature of the extraction features 363 may vary.

As shown in FIGS. 20 and 22, second and third pluralities of light extraction features 367, 369 each of a rounded wedge shape, are disposed on a second or lower side 371 of the substrate 342. As can be seen specifically in these FIGS., the second and third pluralities 367 and 369 are disposed on opposite sides of the substrate 342. As shown in FIG. 24, pluralities of grooves 373, 375 alternatively may be formed in the lower side 371 of the substrate 342. The extraction features 367, 369 and/or grooves 373, 375 allow light to escape the substrate 342, which light would otherwise be largely trapped therein due to total internal reflectance. In a further alternative embodiment shown in FIG. 25, a lower surface 377 of the substrate 342 is curved in convex fashion to enhance extraction of light from the substrate. The lower surface 377 may have a different radius of curvature and/or varied curvature along the length and/or width direction(s).

The waveguide body 340, like the other embodiments disclosed herein, develops an illumination pattern suitable for the uses described herein. The waveguide body 340 directs light developed by the LED element(s) 48 through the substrate 342 toward a desired illumination target surface, such as a roadway, with an illumination pattern 350, for example, as seen in FIG. 23. The illumination pattern 350 is preferably, although not necessarily, offset with respect to a center 365 of the waveguide body 340. The illumination area is disposed away from the center 365 in the direction of the arrow 354 of FIG. 19, with the magnitude of the offset and the size and, possibly, the shapes of the illumination area being a function of distance of the luminaire from the target surface, as should be evident. Referring to FIG. 23, the extraction features 363 are configured to develop an asymmetric light distribution 350 having a lateral extent offset from the lateral axis 359 greater than a longitudinal extent aligned with the longitudinal axis 358.

In a variant of the embodiment of FIGS. 19-26, the light extraction features 363 are disposed adjacent or even in contact with the substrate 342, but are not so intimately joined thereto as to be optically coupled therewith. Accordingly, an air gap exists between the light extraction features 363 and the substrate 342. This air gap prevents trapping of light in the substrate 342, and hence, the second and third pluralities of light extraction features 367, 369 are not needed and may be omitted.

Any combination of extraction features 60, 62, 160, 162, 260, 262, and 363 may be used to produce a desired illumination pattern. For example, a further embodiment 440 shown in FIG. 27 includes the extraction features 260 of the embodiment of FIG. 10 and the extraction features 363 of the embodiment of FIG. 19.

Referring next to FIGS. 27-33, a still further embodiment of a waveguide body 540 includes a plurality of light coupling cavities 544a-544i extending into the waveguide body 540 from an end surface 576 thereof and a number of light redirection elements 546. Light mixing features 580 are disposed on a bottom surface 545 of the waveguide body 540. LED elements (see FIG. 32) 548 are disposed in a stacked configuration within each of the plurality of light coupling cavities 544 as described in greater detail below. As in the previous embodiments, the waveguide body 540 may include a planar substrate, similar or identical to the substrate 42, if desired, or the substrate may simply comprise the bottom surface 545 of the waveguide body 540 as shown.

Figure 28:
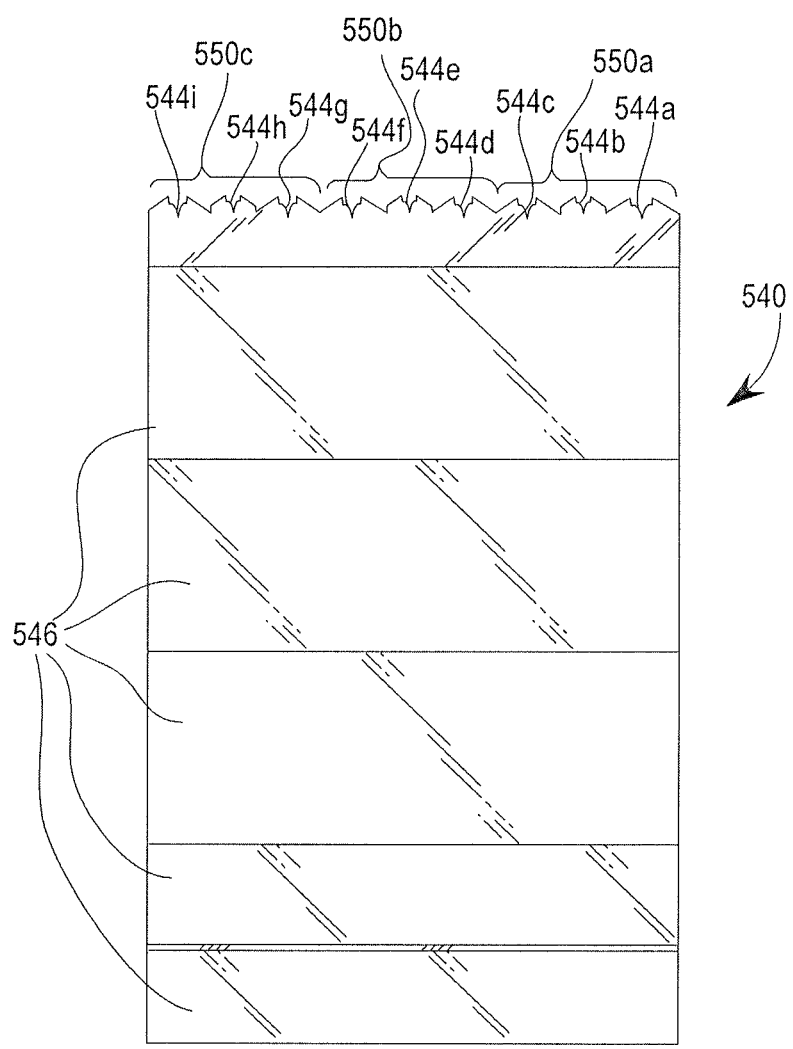
FIG. 28 is a plan view of the sixth embodiment of FIG. 27.

As seen in FIG. 28, the plurality of light coupling cavities includes three groups 550a-550c, each of which includes three light coupling cavities of substantially the same shape. However, two of the coupling cavities of each group 550a-550c are larger than a remaining coupling cavity of the group and the remaining coupling cavity is disposed between the two larger coupling cavities. For example, group 550a shown in FIG. 29 includes two larger coupling cavities 544a, 544c and a remaining coupling cavity 544b.

Similarly, group 550b includes two larger coupling cavities 544e, 544f and a remaining coupling cavity 544e, and group 550c includes two larger coupling cavities 544g, 544i and a remaining coupling cavity 544h. Preferably, all of the light coupling cavities 544a-544i have the same shape, although other shapes may be used to effectuate a desired illumination pattern.

Figure 29:
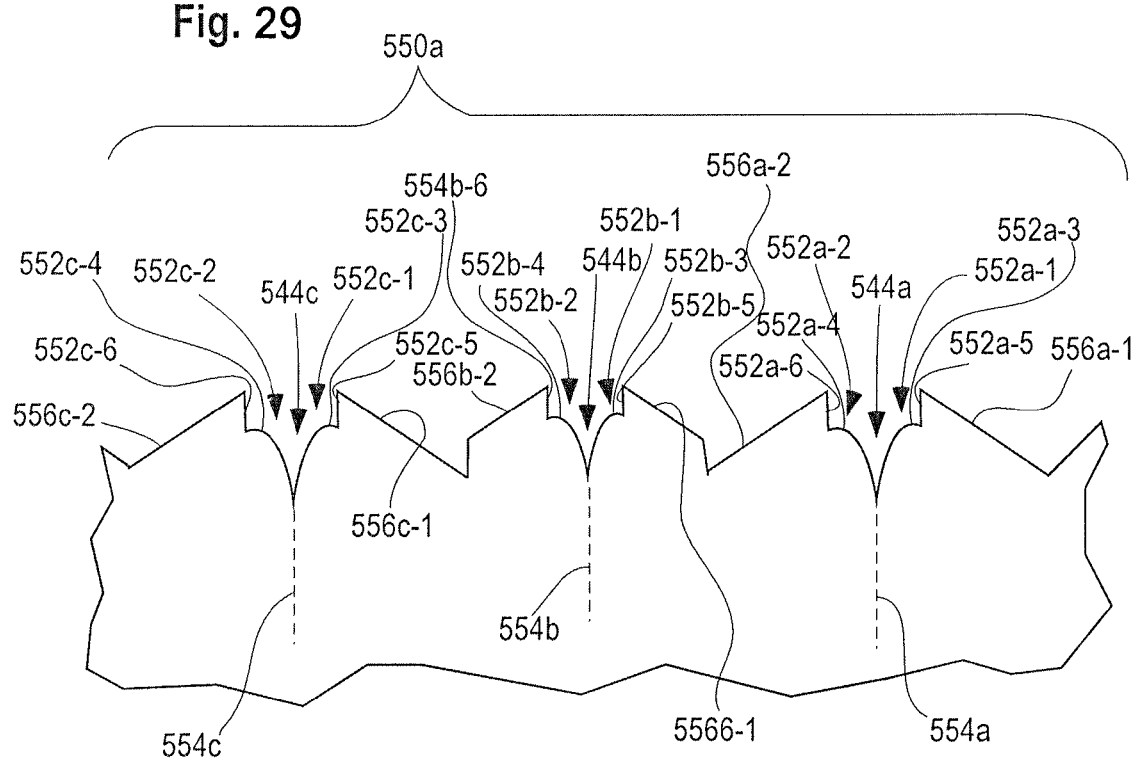
FIG. 29 is an enlarged, fragmentary view of a plurality of coupling cavities of the sixth embodiment of FIG. 27.

Referring to FIG. 29, each light coupling cavity 544 includes two coupling surfaces 552-1, 552-2 that are mirror images of one another on either side of an axis 554 of symmetry. Planar portions 552-5, 552-6 of the respective coupling surfaces 552-1, 552-2 are spaced apart, and curved portions 552-3, 552-4 of the respective coupling surfaces 552-1, 552-2 meet along the axis of symmetry 554. Two control surfaces 556-1, 556-2 are provided on each side of the coupling surfaces 552-1, 552-2 adjacent one of the planar portions 552-5, 552-6 thereof and extend into the waveguide 540 from the end surface 576. The coupling surfaces 552-1, 552-2 and the control surfaces 556-1, 556-2 are shaped to direct light emitted from a light source 548 substantially in defined paths in the waveguide. The coupling surfaces 556-1, 556-2 and the control surfaces 552-1, 552-2 may be smooth, textured, curved, or otherwise shaped to affect light mixing and/or redirection. In the embodiment shown in FIG. 29, each of the curved portions 552-3, 552-4 of the coupling surfaces 552-1, 552-2 and the control surfaces 556-1, 556-2 has a piecewise linear shape. Each of the curved portions 552-3, 552-4 preferably approximates a curve, while each of the control surfaces 556-1, 556-2 preferably approximates a line. The dimensions provided in Table 1 below in reference to FIG. 29B provides the angles of the piecewise linear segments taken in five-degree intervals along the entire surface of a coupling surface 552-1, 552-2 and a control surface 556-1, 556-2.

The light redirection elements 546 include at least a plurality of light extraction features 563a-563e. The light extraction features 563a-563e are linear in overall side-to-side extent or shape and include five wedge-shaped (in cross-section) extraction features. Further, the light extraction features 563a-563e are preferably symmetric with respect to a centerline 552 of the waveguide body 540, although other configurations are envisioned. In other embodiments, the width, length, and curvature and/or other shape(s) of the extraction features may vary as in the previous embodiments.

Figure 32:
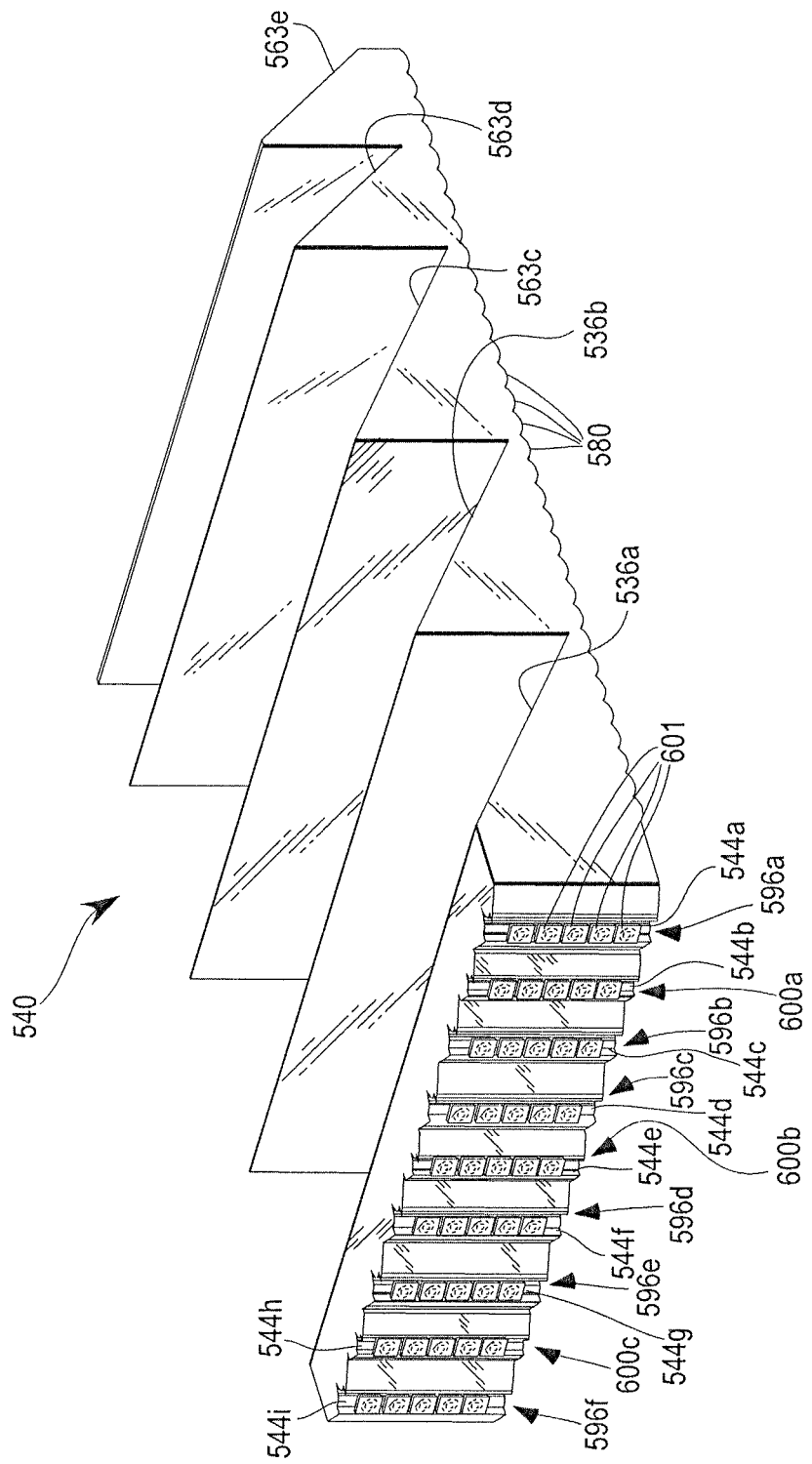
FIG. 32 is an isometric view of the waveguide body of FIG. 27 and a plurality of LEDs.

As shown in FIG. 32, LED elements 548 are disposed within the coupling cavities 544a-544i of the waveguide body 540. Each LED element 548 may be a single white or other color LED, or each may comprise multiple LEDs either mounted separately or together on a single substrate or package to form a module including, for example, at least one phosphor-coated LED either alone or in combination with at least one color LED, such as a green LED, a yellow LED, a red LED, etc. In the embodiment of FIG. 32, individual blue-shifted yellow LEDs 396 and individual red LEDs 600 are disposed in or adjacent the light coupling cavities. In general, at least one blue-shifted yellow LED 596 is disposed in or adjacent each of the two larger coupling cavities of each group of three coupling cavities 550 and at least one red LED 600 is disposed in or adjacent the remaining coupling cavity of each group. In the specific illustrated embodiment, each coupling cavity 544 receives five equally spaced and stacked LEDs 596a-596f and 600a-600c each disposed on a carrier 601 such that the LEDs are disposed in rows across a width of the waveguide 540. The waveguide body 540 therefore includes six sets of five stacked blue-shifted yellow LEDs 596 in or adjacent the larger light coupling cavities and three sets of five stacked red LEDs 600 disposed in or adjacent the remaining light coupling cavities. The number and configuration of LEDs 548 may vary depending on the shape of the coupling cavity.

Figure 27:
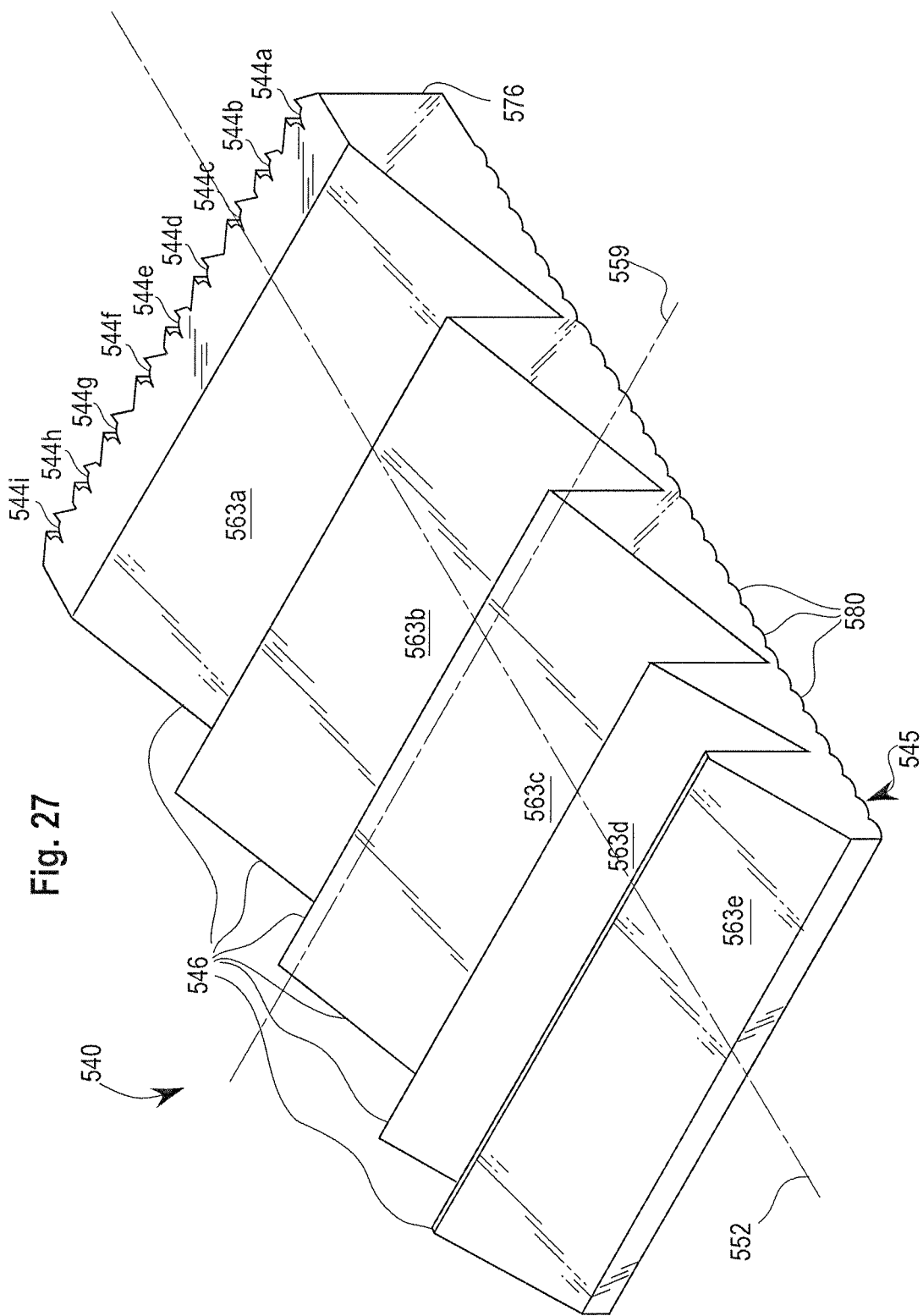
FIG. 27 is an isometric view from above of a sixth embodiment of a waveguide body.

The light developed by the LEDs 548 is directed into groups of light rays by the control surfaces 552, wherein the rays of each group of light rays are directed within a range of angles within the waveguide body. Thus, beam control is accomplished by the coupling cavities. Such light travels through the waveguide body 540 and is redirected downwardly by the extraction features 563 as shown in FIG. 27 and is emitted out the second side of the waveguide body 540. As light is emitted from the second side, light mixing features 580 promote color mixing in the event that different color LEDs 548 are used and/or promote luminance uniformity in the waveguide body 540 regardless of whether multi-color or monochromatic LEDs are used. The light mixing features 580 have an elongate linear extent along a lateral direction 559 of the waveguide body 540 and are rounded and convex in cross-sectional shape.

The waveguide body 540, like the other embodiments disclosed herein, develops an illumination pattern 550 suitable for the uses described herein. The waveguide body directs light developed by the LED element(s) toward a desired illumination target surface, such as a roadway, with an illumination pattern, for example, as seen in FIG. 33. The illumination pattern 550 is preferably, although not necessarily, offset with respect to a center of the waveguide body as described above. Referring to FIG. 33, the extraction features 563 are configured to develop an asymmetric light distribution having a lateral extent offset from the lateral axis 559 greater than a longitudinal extent aligned with the longitudinal axis 552.

As noted above, any of the waveguide bodies disclosed herein can be used in many different applications, for example, a parking lot light, a roadway light, a light that produces a wall washing effect, a light usable in a large structure, such as a warehouse, an arena, a downlight, etc. A luminaire incorporating any of the waveguide bodies disclosed herein is particularly adapted to develop high intensity light greater than 1000 lumens, and more particularly greater than 2000-5000 lumens, and can even be configured to develop 35,000 or more lumens by adding LED elements and, possibly, other similar, identical or different waveguide bodies in a luminaire.

Further in any of embodiments disclosed herein, the waveguide body is made of one or more optical grade materials including one or more of acrylic, air, polycarbonate, molded silicone, glass, and/or cyclic olefin copolymers, and combinations thereof, possibly in a layered arrangement, to achieve a desired effect and/or appearance.

In examples, each waveguide body disclosed herein has the dimensions noted in the following table and as seen in FIGS. 2A, 4A, 7A, 8A, 9A, 20B, 21A, 22A, 28A, 29A, 29B, and 31A. It should be noted that the dimensions in the following table are exemplary only and not limiting (several of the dimensions are taken with respect to a center line 52 of the waveguide body 40, 140 of respective FIGS. 2A, 7A):

TABLE 1

| REFERENCE | NOMINAL DIMENSION (Millimeters - unless otherwise specified) |
|---|---|
| FIG. 2A | |
| A | 100 |
| B | 100 |
| C | 8.86 |
| D | 13.27 |

TABLE 1-continued

Figure 4A:
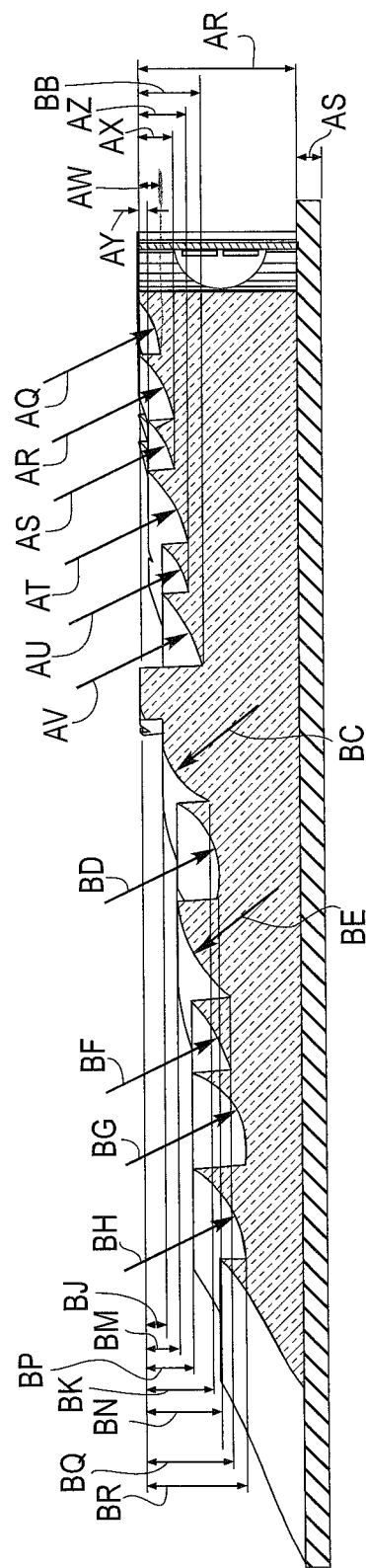
FIG. 4A is a sectional view identical to FIG. 4 illustrating sample dimensions for the waveguide body of FIG. 1.
Figure 5B:
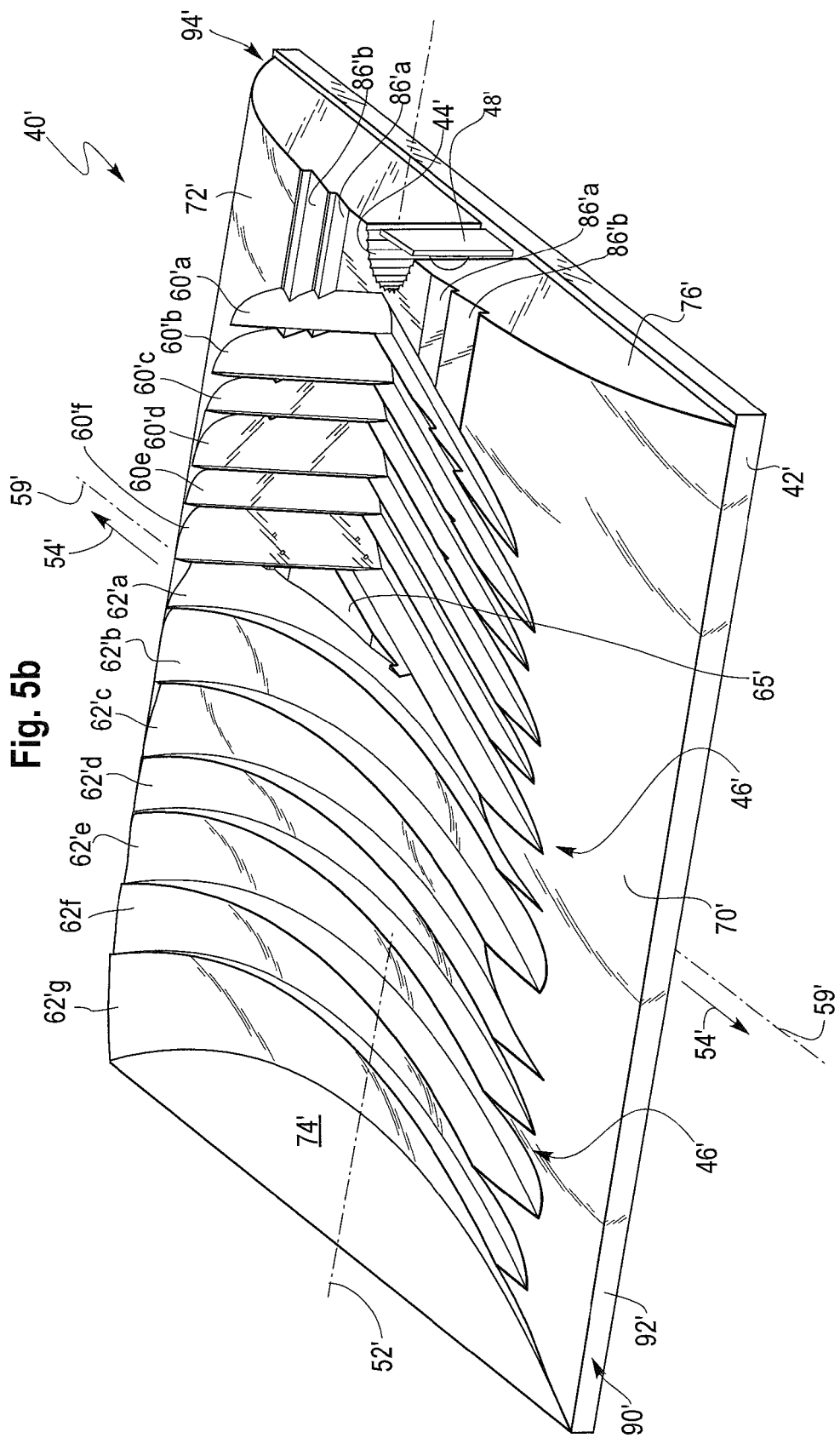
FIG. 5B is an isometric view from above of the first embodiment of a waveguide body formed as a single piece.
Figure 7A:
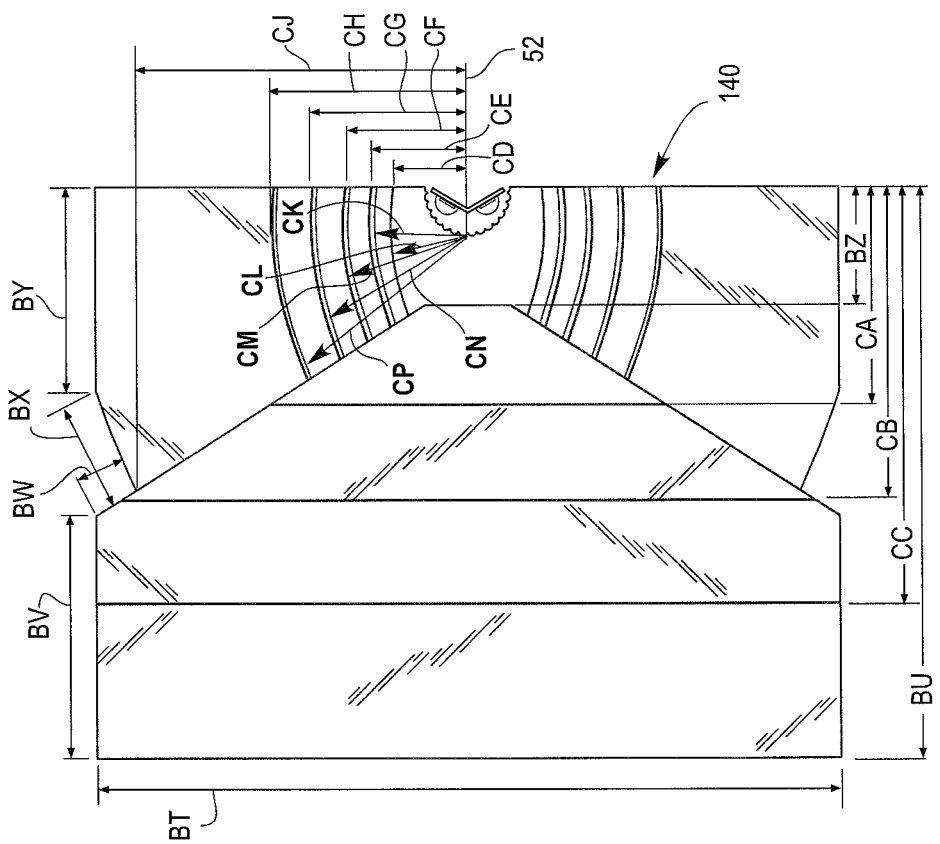
FIG. 7A is a plan view identical to FIG. 7 illustrating sample dimensions of the waveguide body of FIG. 6.
Figure 7:
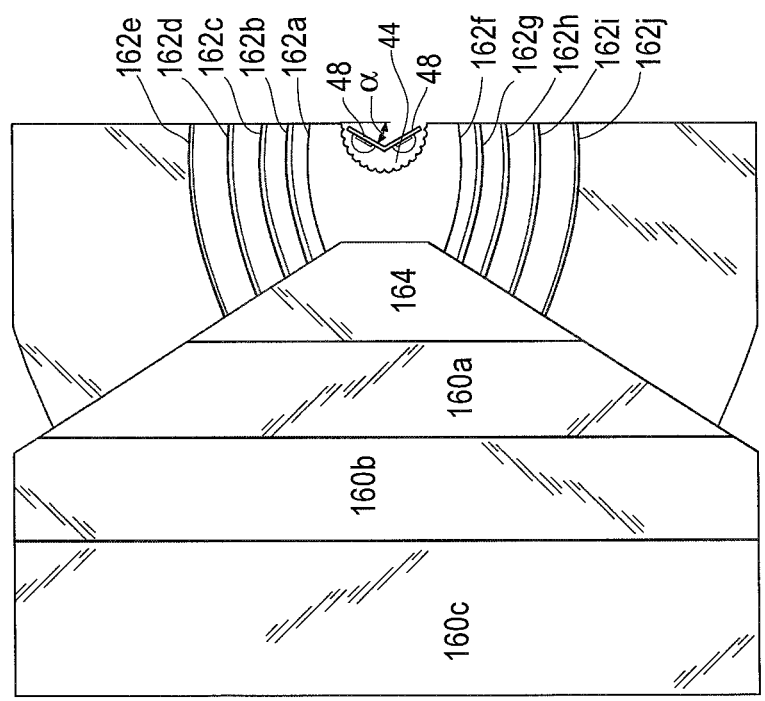
FIG. 7 is a plan view of the second embodiment of FIG. 6.
Figure 10:
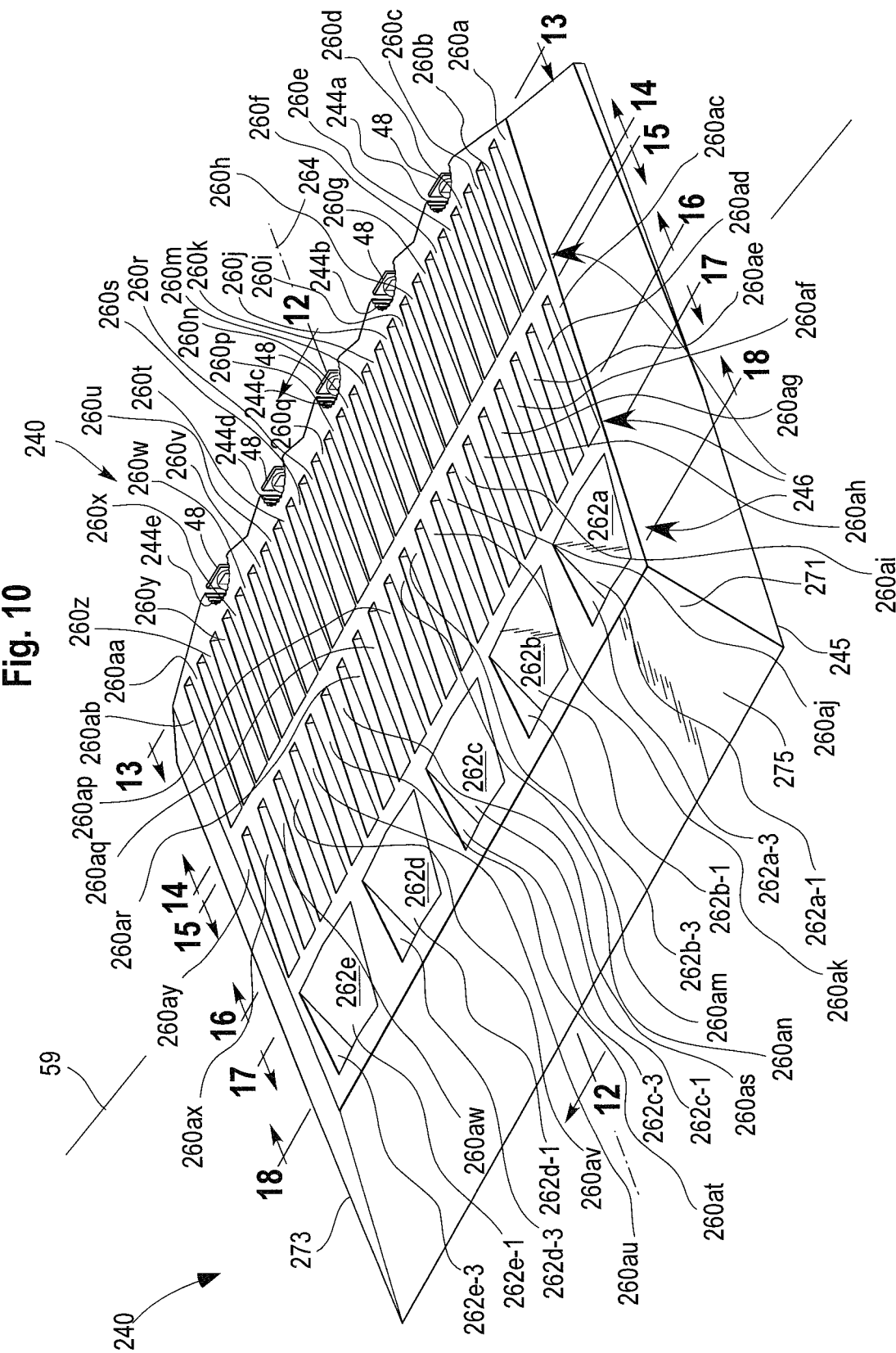
FIG. 10 is an isometric view of a third embodiment of a waveguide body.

| REFERENCE | NOMINAL DIMENSION (Millimeters - unless otherwise specified) |
|---|---|
| E | 19.25 |
| F | 31.20 |
| G | 35.02 |
| H | 37.81 |
| J | 40.83 |
| K | 40.00 |
| L | 41.82 |
| M | 43.40 |
| N | 44.90 |
| P | 5.15 |
| Q | 9.17 |
| R | 14.19 |
| S | 17.94 |
| T | 23.50 |
| U | 27.19 |
| V | 32.74 |
| W | 36.69 |
| X | 42.86 |
| Y | 50.13 |
| Z | 57.61 |
| AA | 70.22 |
| AB | 77.07 |
| AC | 62.95 |
| AD | 86.69 |
| AE | 142.38 degrees |
| AF | 142.38 degrees |
| AG | 142.38 degrees |
| AH | 142.38 degrees |
| AJ | 142.38 degrees |
| AK | 142.38 degrees |
| AL | 142.38 degrees |
| AM | Spline curve |
| FIG. 4A | |
| AR | 12.0 |
| AS | 2.0 |
| AQ | Spline curve |
| AR | Spline curve |
| AS | Spline curve |
| AT | Spline curve |
| AU | Spline curve |
| AV | Spline curve |
| AW | 1.70 |
| AX | 2.70 |
| AZ | 3.70 |
| BA | 1.70 |
| BB | 4.70 |
| BC | Spline curve |
| BD | Spline curve |
| BE | Spline curve |
| BF | Spline curve |
| BG | Spline curve |
| BH | Spline curve |
| BJ | 1.70 |
| BK | 5.15 |
| BM | 2.70 |
| BN | 5.70 |
| BP | 3.70 |
| BQ | 6.70 |
| BR | 7.70 |
| BS | 5.70 |
| FIG. 7A | |
| BT | 250 |
| BU | 191.74 |
| BV | 81.28 |
| BW | 15.88 |
| BX | 36 |
| BY | 68.42 |
| BZ | 40 |
| CA | 72.97 |
| CB | 105.14 |
| CC | 139.78 |
| CD | 25 |
| CE | 32.11 |
| CF | 41.14 |

TABLE 1-continued

Figure 20B:
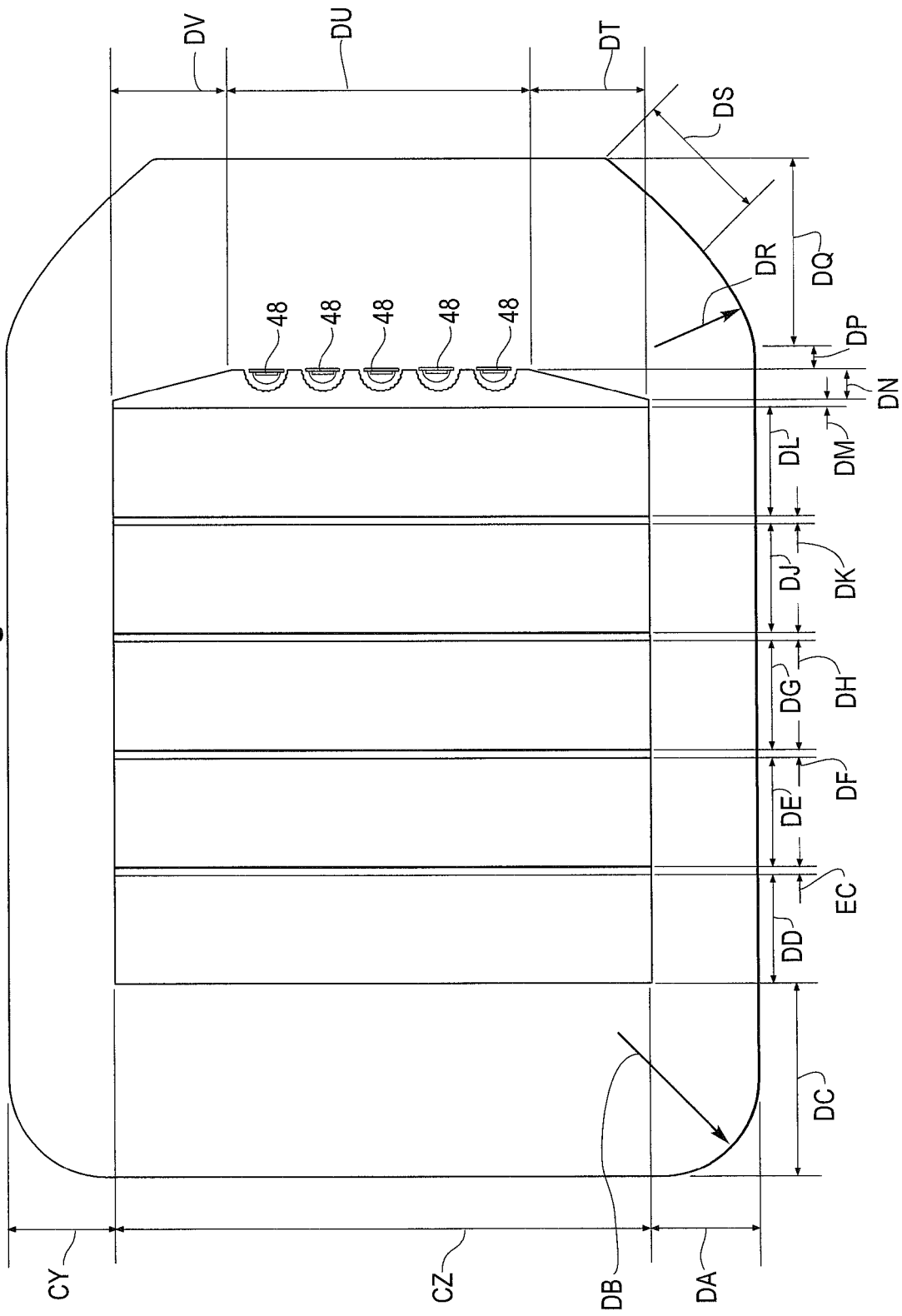
FIG. 20B is a plan view identical to FIG. 20A illustrating sample dimensions of the waveguide body of FIG. 19.
Figure 26:
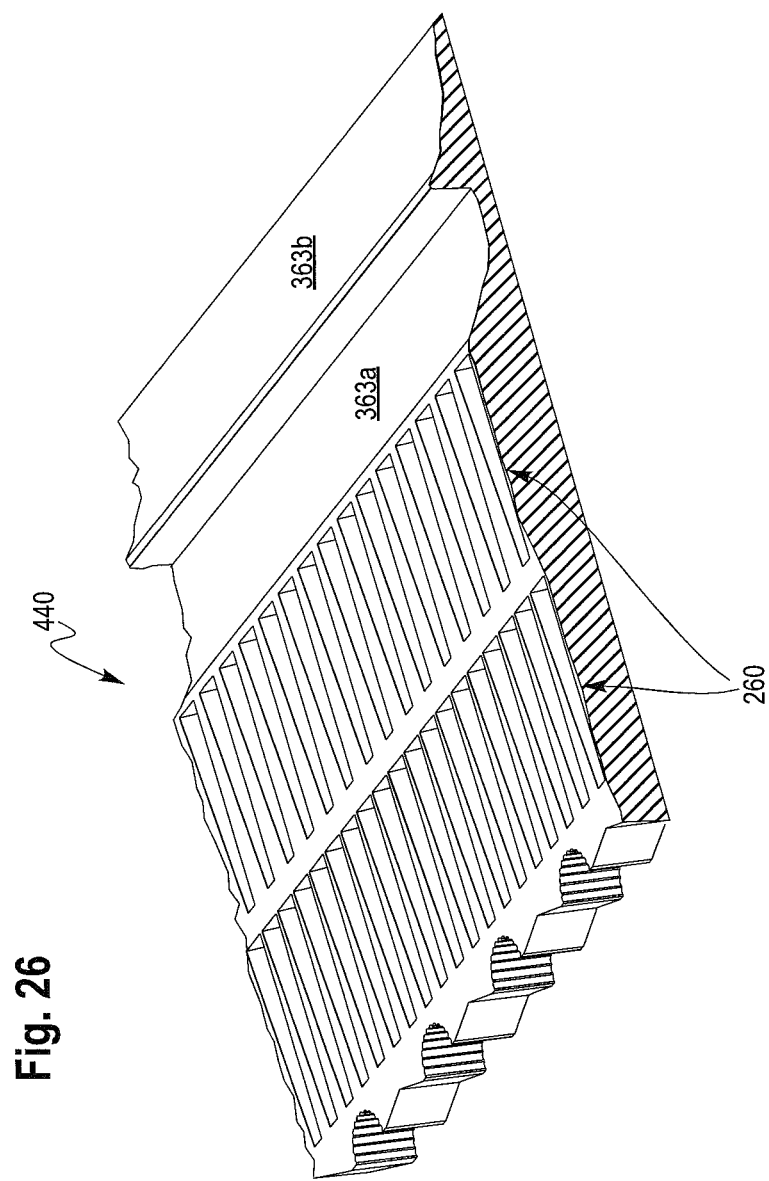
FIG. 26 is an isometric view from above of a fifth embodiment of a waveguide body.
Figure 28A:
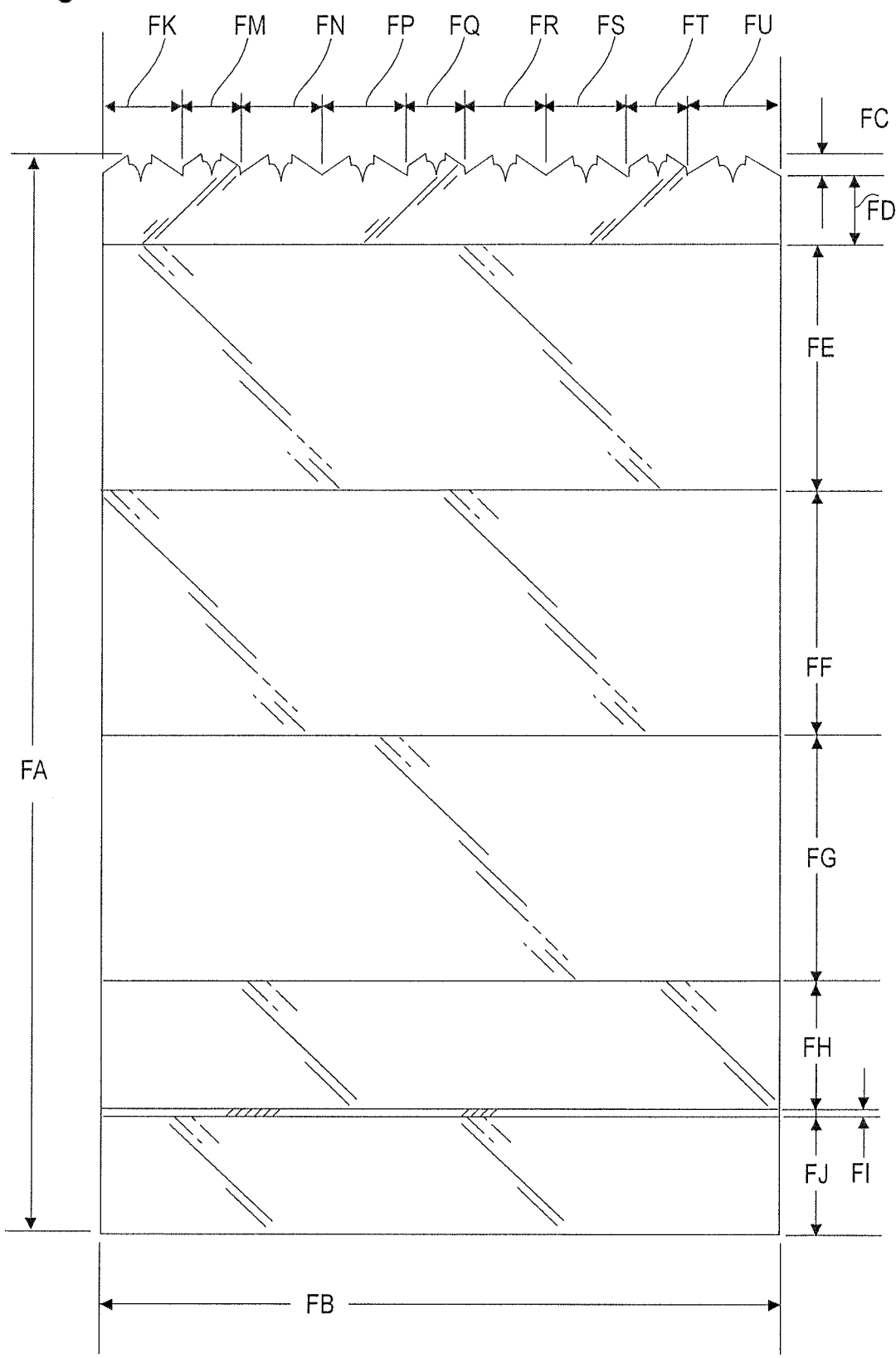
FIG. 28A is a plan view identical to FIG. 28 illustrating sample dimensions of the waveguide body of FIG. 27.
Figure 29A:
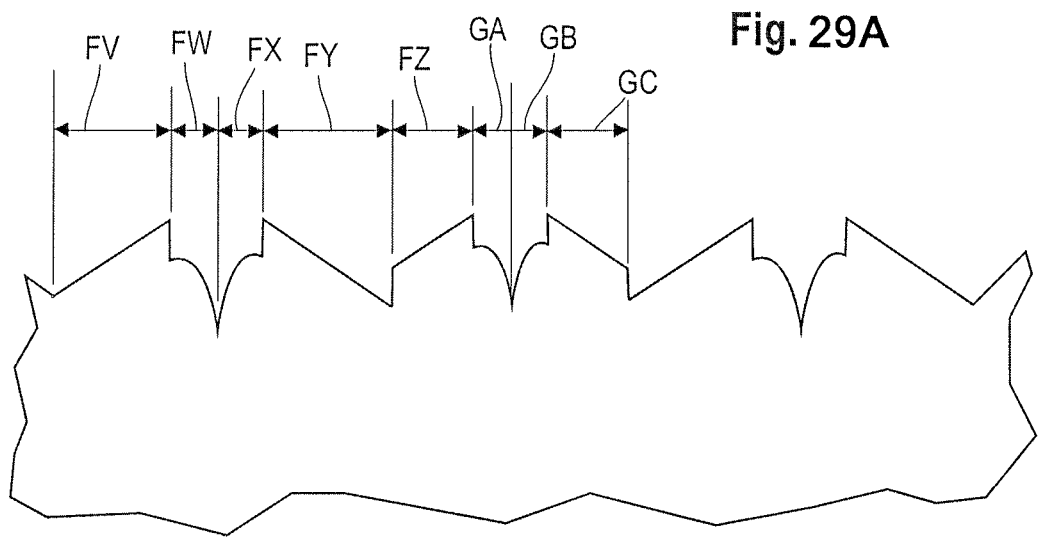
FIG. 29A is an enlarged, fragmentary view identical to FIG. 29 illustrating further sample dimensions of the coupling cavities of the waveguide body of FIG. 27.
Figure 29B:
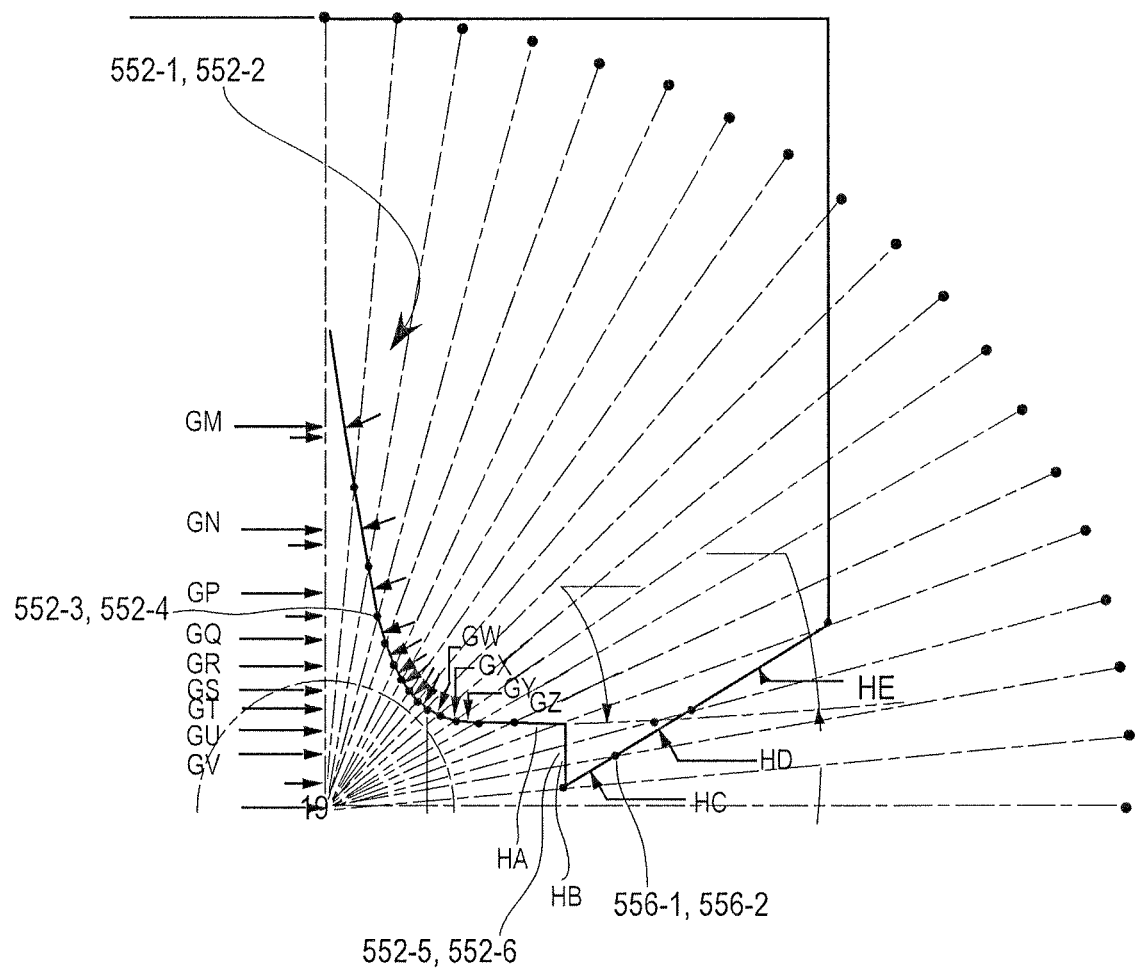
FIG. 29B is an enlarged, fragmentary view of the coupling cavities of the waveguide body of FIG. 27 illustrating further sample dimensions.
Figure 30:
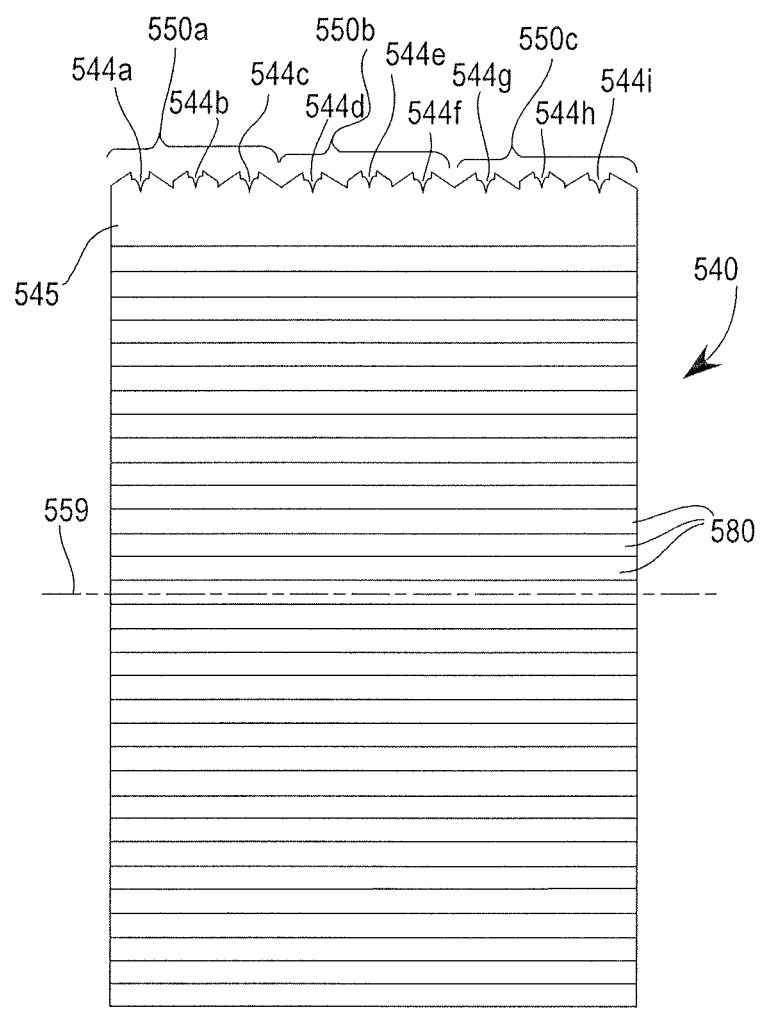
FIG. 30 is a bottom elevational view of the sixth embodiment of FIG. 27.
Figure 31:
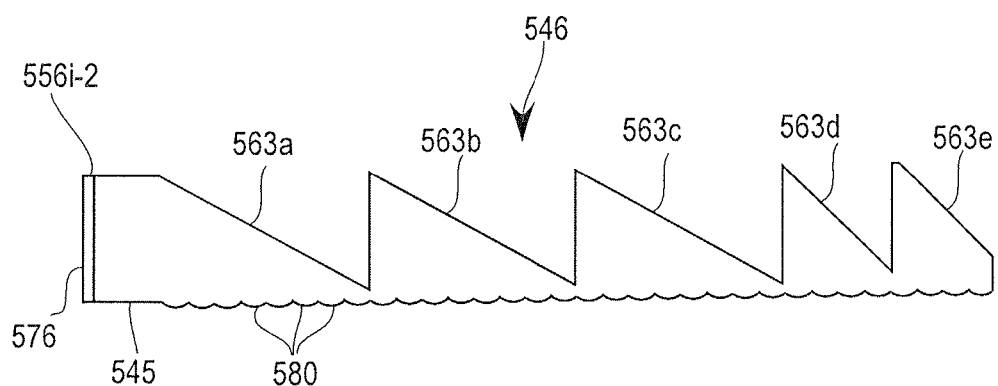
FIG. 31 is a side elevational view of the sixth embodiment of FIG. 27.
Figure 31A:
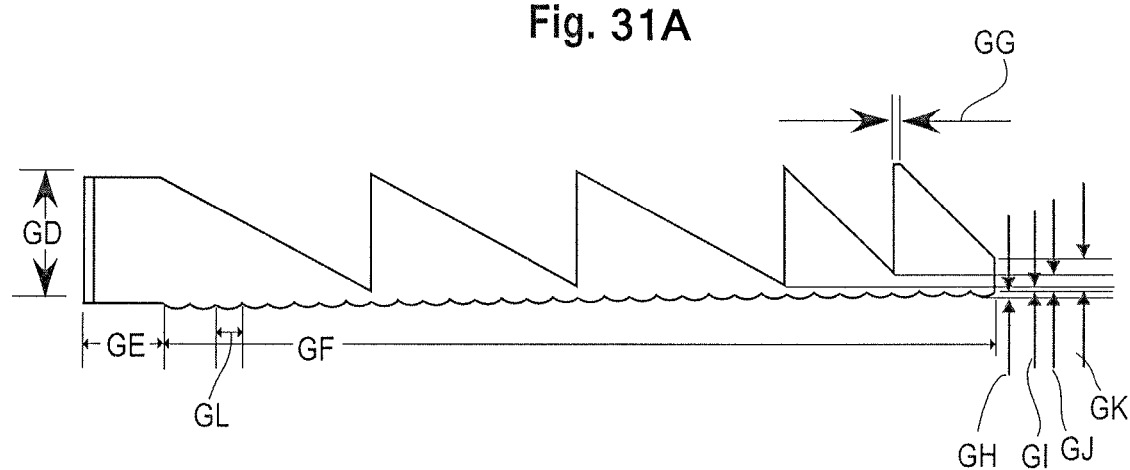
FIG. 31A is a side elevational view identical to FIG. 31 illustrating additional sample dimensions of the waveguide body of FIG. 27.

| REFERENCE | NOMINAL DIMENSION (Millimeters - unless otherwise specified) |
|---|---|
| CG | 52.21 |
| CH | 65.07 |
| CJ | 116.68 |
| CK | parabolic 95.4 focal length |
| CL | parabolic 95.4 focal length |
| CM | parabolic 95.4 focal length |
| CN | parabolic 95.4 focal length |
| CP | parabolic 95.4 focal length |
| FIG. 8A | |
| CQ | 30 |
| CR | 26.93 |
| CS | 21.81 |
| CT | 3.19 |
| CU | 15 |
| CV | 20 |
| FIG. 9A | |
| CW | 20 |
| CX | 15 |
| FIG. 20B | |
| CY | 30.3 |
| CZ | 140 |
| DA | 30.3 |
| DB | 25 |
| DC | 50.49 |
| DD | 28.27 |
| DE | 28.27 |
| DF | 2 |
| DG | 28.27 |
| DH | 2 |
| DJ | 28.27 |
| DK | 2 |
| DL | 28.27 |
| DM | 2 |
| DN | 8 |
| DP | 1.82 |
| DQ | 53.37 |
| DT | 31 |
| DU | 78 |
| DV | 31 |
| FIG. 21A | |
| DW | 3.18 |
| DX | 3 |
| DY | 12 |
| FIG. 22A | |
| DZ | 44.29 |
| EA | 7.46 |
| EB | 8.15 |
| FIG. 28A | |
| FA | 176 |
| FB | 109.5 |
| FC | 3.14 |
| FD | 11.85 |
| FE | 46.19 |
| FF | 46.19 |
| FG | 46.19 |
| FH | 29.7 |
| FI | 1 |
| FJ | 26.87 |
| FK | 13.5 |
| FM | 9.5 |
| FN | 13.5 |
| FP | 13.5 |
| FQ | 9.5 |
| FR | 13.5 |
| FS | 13.5 |
| FT | 9.5 |
| FU | 13.5 |
| FIG. 29A | |
| FV | 26.87 |
| FW | 2.09 |
| FX | 2.09 |
| FY | 26.87 |
| FZ | 3.27 |
| GA | 1.48 |
| GB | 1.48 |
| GC | 3.27 |
| FIG. 29B | |
| GM | 9.0 degrees |
| GN | 10.0 degrees |
| GP | 12.0 degrees |
| GQ | 15.0 degrees |
| GR | 20.0 degrees |
| GS | 27.0 degrees |
| GT | 35.0 degrees |
| GU | 45.0 degrees |
| GV | 55.0 degrees |
| GW | 65.0 degrees |
| GX | 75.0 degrees |
| GY | 82.0 degrees |
| GZ | 87.0 degrees |
| HA | 90.0 degrees |
| HB | 0 degrees |
| HC | 60.7 degrees |
| HD | 59.0 degrees |
| HE | 57.5 degrees |
| FIG. 31A | |
| GD | 25 |
| GE | 16 |
| GF | 160 |
| GG | 1 |
| GH | 0.88 |
| GI | 1.91 |
| GJ | 4 |
| GK | 6 |
| GL | 5 |

From the foregoing dimensions one can calculate extraction feature aspect ratios for the embodiments of FIGS. 1-5, 6-9, 19-26, and 27-34 as follows:

$$\text{Aspect Ratio} = \text{Width of ridge}/\text{Greatest height extent of ridge} \quad (1)$$

Using the foregoing equation, one can calculate (at least approximately) aspect ratios AR1, AR2, AR3, AR4, AR5, and AR6 of extraction features 60a, 62a, 160a, 162b, 363a, and 563a, respectively, as follows:

$$AR1=(Q-P)/(AW)=(9.17-5.15)/(1.7)=2.364 \quad (2)$$

$$AR2=(X-W)/(BK-BJ)=(42.86-36.69)/(5.15-1.7) \\ =6.17/3.45=1.788 \quad (3)$$

$$AR3=(CB-CA)/(CU)=(105.14-72.97)/(15)=32.17/15=2.145 \quad (4)$$

$$AR4=(CE-CD)/(CW)=(32.11-25)/(20)=7.11/20=0.356 \quad (5)$$

$$AR5=(DL)/(DY)=28.27/3.18=8.890 \quad (6)$$

$$AR6=(FE/GD)=46.19/25=1.848 \quad (7)$$

As seen in FIGS. 2A, 4A, 7A, 8A, 9A, 20B, 21A, 22A, 28A, 29A, 29B, and 31A, and as calculated above in the equations (2)-(7), the extraction features range between aspect ratios of about 0.35 to about 8.90. In some embodiments such as the waveguide body 140 of FIG. 6, the plurality of extraction features includes a range of aspect ratios. In other embodiments such as the waveguide body 340 of FIG. 19, the plurality of extraction features may have substantially similar aspect ratios. In a waveguide body section having a different size, the dimension(s) of the extraction feature(s) are scaled based on the total thickness of the waveguide while the aspect ratio falls within the ranges noted above.

The waveguide body 40 of FIGS. 1-5 includes extraction features 60, 62 that are deeper (increasing in height) with distance from the coupling cavity 44 of the waveguide 40. Thus, for example, as seen in FIG. 4A, the extraction feature dimension AW is less than the dimensions AX, AZ, and BB, and the latter dimensions are less than the dimensions BK, BN, BQ, and BR. The same holds true for the extraction features 160 of the waveguide body 140 of FIG. 8. In contrast, extraction features 162a-162j of the waveguide body 140 of FIG. 8 and the extraction features 363 of the waveguide body 340 of FIG. 21 have the same depth or height. In the embodiments described herein, the heights of the extraction features range from about 1.5 mm to about 25 mm. Such height depends on the overall thickness of the waveguide body section. Extraction feature heights are preferably expressed as a percentage of overall thickness because, in general, the maximum height of the extraction features is only limited by the structural integrity of the remaining material. In embodiments where the redirection features are formed integral with the substrate, the height of the extraction features is not so limited. Each extraction feature preferably has a height between about 5% to about 100% of the overall thickness of the waveguide (the overall thickness is the top to bottom dimension at the wall defining the coupling cavity) and, more preferably, a height between about 80% and 100% of the overall thickness of the waveguide. In embodiments where the substrate and redirection features are separate, greater extraction feature heights might be achievable using stronger material(s) for the waveguide. As noted above, the heights of the extraction features and ratios to the overall thickness of the waveguide body section will depend on the size and geometry of the waveguide body section.

Still further, the spacings (i.e., pitch) between adjacent extraction features overall increase with distance from the coupling cavity (although not necessarily in every circumstance between adjacent extraction features having small or approximately equal aspect ratios). The spacing between adjacent extraction features may be as small as about 7 mm (or less) near the coupling cavity and may be 52 mm (or more) at the opposite end of the waveguide.

In any of the embodiments disclosed herein, the extraction features may be similar or identical to one another in shape, size, and/or pitch, or may be different from one another in any one or more of these parameters, as desired. Further, while the extraction features are shown as extending away from the surfaces of the substrate, it should be noted that one or more extraction features may extend into or be disposed on any of the portions of the substrate In the illustrated embodiments, the multiple LED coupling cavities are preferably disposed at equally spaced locations in each body. Thus, heat developed by the LED elements disposed in or adjacent the coupling cavities is spread out and more readily managed.

If desired, the distribution of extraction elements over the entire waveguide body may be asymmetric so that an overall desired light emission distribution can be obtained. Such a feature allows effective optic function in a limited space/size and for modest cost in an application where multiple light elements are used.

By using the waveguide bodies disclosed herein ratios of spacing on opposite sides of the roadway to mounting height of at least about 1:1, and more preferably between about 1:1 and about 2.5, can be attained. Ratios of spacing along the roadway to mounting height of at least about 5:1, preferably between about 6:1 and about 8:1, and most preferably about 7:1, can be attained.

If desired, each light coupling cavity may not be cylindrical, but instead may comprise a tapered bore defined by a number (e.g., six) equally-sized facets.

The placement of multiple LED element(s) and the optics of the waveguide bodies overlay the illumination from each LED element onto each other, which further helps color mixing while maintaining a desired photometric distribution. If necessary or desirable, color mixing may be enhanced by using any of the structures or cavities disclosed in co-pending applications U.S. patent application Ser. No. 14/101,086, filed Dec. 9, 2013, entitled "Optical Waveguides and Luminaires Incorporating Same,", U.S. patent application Ser. No. 14/101,132, filed Dec. 9, 2013, entitled "Waveguide Bodies Including Redirection Features and Methods of Producing Same,", U.S. patent application Ser. No. 14/101,147, filed Dec. 9, 2013, entitled "Luminaire Using Waveguide Bodies and Optical Elements", and U.S. patent application Ser. No. 14/101,051, filed Dec. 9, 2013, entitled "Optical Waveguide and Lamp Including Same", owned by the assignee of the present application and filed herewith, the disclosures of which are incorporated by reference herein.

If desired, any of the features disclosed in co-pending U.S. patent application Ser. No. 13/839,949 and/or U.S. patent application Ser. No. 13/840,563, respectively), may be used in the luminaire 40 as desired.

Further, any LED chip arrangement and/or orientation as disclosed in U.S. patent application Ser. No. 14/101,147, filed Dec. 9, 2013, entitled "Luminaire Using Waveguide Bodies and Optical Elements", incorporated by reference herein and owned by the assignee of the present application, may be used in the devices disclosed herein. Where two LED elements are used, it may be desired to position the LEDs elements within or adjacent the coupling cavity along a common vertical axis or the LED elements may have different angular orientations, as desired. The orientation, arrangement, and position of the LEDs may be different or identical in each waveguide body section of a waveguide as desired. Still further, each light coupling cavity may be non-cylindrical and may have a substantially flat shape, a segmented shape, an inclined shape to direct light out a particular side of the waveguide body, etc.

While a uniform distribution of light may be desired in certain embodiments, other distributions of light may be contemplated and obtained using different arrays of extraction features.

Other embodiments of the disclosure including all of the possible different and various combinations of the individual features of each of the foregoing embodiments and examples are specifically included herein. Thus, for example, a waveguide of one of the disclosed shapes may include extraction features of the same or a different shape, and the extraction features may be symmetric or asymmetric, the extraction features may have differing or the same geometry, spacing, size, etc. without departing from the scope of the invention.

INDUSTRIAL APPLICABILITY

As described above, directing light into a wide range of refraction angles enhances light mixing. A wide range of refracted light ray angles can be obtained by configuring the interface surfaces to include a wide range of angles relative to the incident light rays. Overall waveguide body shapes and coupling feature and redirection feature shapes such as curved (including convex, concave, and combinations of convex and concave surfaces), planar, non-planar, tapered, segmented, continuous or discontinuous surfaces, regular or irregular shaped surfaces, symmetric or asymmetric shapes, etc. can be used, it being understood that, in general, light mixing (consistent with the necessary control over light extraction) can be further improved by providing an increased number of interface surfaces and/or more complex interface shapes in the light path.

When one uses a relatively small light source which emits into a broad (e.g., Lambertian) angular distribution (common for LED-based light sources), the conservation of etendue, as generally understood in the art, requires an optical system having a large emission area to achieve an asymmetric angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and light distribution. This coupling allows the full range of angular emission from the source, including high-angle light, to be re-directed, resulting in higher optical efficiency in a more compact form factor.

While specific coupling features and extraction feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Any of the features such as various shaped coupling cavities, plug members, LED elements, masking element(s), redirection features, extraction features, etc. described and/or claimed in U.S. patent application Ser. No. 13/842,521, U.S. patent application Ser. No. 13/839,949, U.S. patent application Ser. No. 13/841,074, filed Mar. 15, 2013, entitled "Optical Waveguide Body", U.S. patent application Ser. No. 13/840,563, U.S. patent application Ser. No. 14/101,086, filed Dec. 9, 2013, entitled "Optical Waveguides and Luminaires Incorporating Same", U.S. patent application Ser. No. 14/101,132, filed Dec. 9, 2013, entitled "Waveguide Bodies Including Redirection Features and Methods of Producing Same,", U.S. patent application Ser. No. 14/101,147, filed Dec. 9, 2013, entitled "Luminaire Using Waveguide Bodies and Optical Elements", U.S. patent application Ser. No. 14/101,129, filed Dec. 9, 2013, entitled "Simplified Low Profile Module with Light Guide for Pendant, Surface Mount, Wall Mount and Stand Alone Luminaires", and U.S. patent application Ser. No. 14/101,051, filed Dec. 9, 2013, entitled "Optical Waveguide and Lamp Including Same", and International Application No. PCT/US14/13931, filed Jan. 30, 2014, entitled "Optical Waveguides and Luminaires Incorporating Same", incorporated by reference herein and owned by the assignee of the present application may be used with the waveguide bodies disclosed herein in a luminaire, either alone or in combination with one or more additional elements, or in varying combination(s) to obtain light mixing and/or a desired light output distribution. Thus, for example, any of the waveguide bodies disclosed herein may include one or more coupling features, one or more light redirection features, one or more extraction features or optics, and/or particular waveguide body shapes and/or configurations as disclosed in such applications, as necessary or desirable. Other waveguide body form factors than those disclosed herein are also contemplated.

At least some of the waveguide bodies disclosed herein may be used in luminaires that are particularly adapted for use in installations, such as, replacement or retrofit lamps, outdoor products (e.g., streetlights, high-bay lights, canopy lights), and indoor products (e.g., downlights, troffers, a lay-in or drop-in application, a surface mount application onto a wall or ceiling, etc.) preferably requiring a total luminaire output of at least about 3,000 lumens or greater, and, more preferably, a total luminaire output of at least about 18,000 lumens, and most preferably a total lumen output of about 20,000 lumens. Further, the waveguide bodies disclosed herein preferably develop a color temperature of between about 2500 degrees Kelvin and about 6200 degrees Kelvin, and more preferably between about 3000 degrees Kelvin and about 5500 degrees Kelvin, and most preferably between about 3500 degrees Kelvin and about 4500 degrees Kelvin. Also, at least some of the waveguide bodies disclosed herein preferably exhibit an efficacy of at least about 100 lumens per watt, and more preferably at least about 120 lumens per watt, and further exhibit a coupling efficiency of at least about 92 percent. Further, at least some of the waveguide bodies disclosed herein preferably exhibit an overall efficiency (i.e., light extracted out of the waveguide body divided by light injected into the waveguide body) of at least about 85 percent. A color rendition index (CRI) of at least about 80 is preferably attained by at least some of the waveguide bodies disclosed herein, with a CRI of at least about 85 being more preferable. A gamut area index (GAI) of at least about 65 is achievable. The waveguide bodies disclosed herein produce a scotopic to photopic (S/P) ratio of at least 1.4, preferably at least 2.0. Any desired form factor and particular output light distribution, including up and down light distributions or up only or down only distributions, etc.

Embodiments disclosed herein are capable of complying with improved operational standards as compared to the prior art as follows:

| | State of the art standards | Improved standards achievable by present embodiments |
| --- | --- | --- |
| Input coupling efficiency (coupling + waveguide body) | 90% | About 95% plus improvements through color mixing, source mixing, and control within the waveguide body |
| Output efficiency (extraction) | 90% | About 95%: improved through extraction efficiency plus controlled distribution of light from the waveguide body |
| Total system | ~80% | About 90%: great control, many choices of output distribution |

In certain embodiments, the waveguide bodies disclosed herein generally taper from a central portion to an outside edge thereof so that substantially all light is extracted during a single pass of each light ray from the LED element(s) to the outer edge of the waveguide body. This extraction strategy maximizes the incidence of light rays impinging on an outer side of each extraction feature and being reflected out a surface (or surfaces) of the waveguide body in a controlled manner, as opposed to striking other surfaces at an angle greater than the critical angle and escaping as uncontrolled light. The outer sides of the extraction features are accurately formed so that control is maintained over the direction of extracted light, thereby allowing a high degree of collimation. Still further, the waveguide body is very low profile, leaving more room for heat exchanger structures, driver components, and the like. Also, glare is reduced as compared with other lamps using LED light sources because light is directed outwardly in the waveguide body while being extracted from the waveguide body by the extraction features such that the resulting emitted light is substantially mixed and substantially uniformly distributed throughout the beam angle. The result is a light distribution that is pleasing and particularly useful for general illumination and other purposes using a light source, such as one or more LED element(s).

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite. Any of these conditions may be satisfied by the waveguide bodies disclosed herein through appropriate modification thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. An optical waveguide body, comprising:
    first and second pluralities of light extraction features disposed on a first side of the waveguide body and adapted to direct light out of the waveguide body through a second side of the waveguide body opposite the first side, wherein each of the first plurality of light extraction features comprises a linear shape and each of the second plurality of light extraction features comprises at least one of a piecewise linear shape and a nonlinear shape, wherein the piecewise linear shape comprises two adjacent planar surfaces with an angle therebetween of at least about 30 and at most about 220 degrees; and
    a light coupling cavity.

2. The optical waveguide body of claim 1, wherein the light coupling cavity is disposed at an end of the waveguide body, and wherein the end is adjacent both the first side and the second side.

3. The optical waveguide body of claim 1, wherein each of the first plurality of light extraction features comprises first and second linear portions.

4. The optical waveguide body of claim 3, wherein the first plurality of extraction features are chevron-shaped.

5. The optical waveguide body of claim 1, further comprising a third plurality of light extraction features disposed transversely with respect to the first and second pluralities of light extraction features and wherein the third plurality of light extraction features is disposed between the light coupling cavity and sides of the waveguide body.

6. The optical waveguide body of claim 1, wherein at least some of the first plurality of light extraction features are wedge-shaped.

7. A waveguide body comprising a longitudinal axis and a lateral axis perpendicular to the longitudinal axis, comprising:
    a plurality of light extraction features at least two of which are separated from one another along the longitudinal axis and wherein at least one of the extraction features comprises a lateral extent; and
    at least one light coupling cavity adapted to transmit light from a light source into the waveguide body;
    wherein the extraction features are configured to develop an asymmetric light distribution; and
    wherein the plurality of light extraction features and the at least one coupling cavity are disposed along the longitudinal axis.

8. The waveguide body of claim 7, wherein the plurality of light extraction features comprises a first plurality of linear extraction features and a second plurality of light extraction features.

9. The waveguide body of claim 7, wherein the extraction features are disposed in rows.

10. The waveguide body of claim 7, wherein the asymmetric light distribution comprises a longitudinal portion along the longitudinal axis and a lateral portion along the lateral axis and the lateral portion is greater than the longitudinal portion.

11. The waveguide body of claim 7, wherein the waveguide body further comprises a substrate separate from the extraction features and wherein the extraction features and the substrate comprise different materials.

12. The waveguide body of claim 7, further comprising an LED component extending into the light coupling cavity comprising first and second sets of LEDs wherein each LED of the first set comprises a blue-shifted yellow LED and each LED of the second set comprises a red LED wherein the red LEDs are disposed between the blue-shifted yellow LEDs.

13. The waveguide body of claim 12, wherein the first and second sets of LEDs are disposed on a base defined by four edges, and the first set of LEDs comprises six blue-shifted yellow LEDs disposed on the base along the four sides and the second set of LEDs comprises two red LEDs disposed on the base inside the blue-shifted yellow LEDs.

14. The waveguide body of claim 7, wherein the at least one light coupling cavity is defined by two coupling surfaces each comprising a planar portion and a curved portion, and wherein the coupling surfaces are disposed on either side of an axis of symmetry and are mirror images of one another.

15. The waveguide body of claim 14, further comprising two control surfaces disposed on opposite sides of the axis of symmetry, wherein each control surface is disposed adjacent one of the planar portions of the light coupling cavity.

16. The waveguide body of claim 15, wherein the light coupling cavity receives a light source, and wherein the control surfaces are configured to direct light emitted from light source substantially in defined paths in the waveguide body.

17. The waveguide body of claim 16, further comprising a plurality of coupling cavities extending along a thickness of the waveguide body, wherein the plurality of coupling cavities comprises three coupling cavities of substantially the same shape, and wherein two of the coupling cavities are larger than a remaining coupling cavity, and wherein the remaining coupling cavity is disposed between the two coupling cavities.

18. The waveguide body of claim 16, further comprising three pluralities of coupling cavities extending along a thickness of the waveguide body, wherein each plurality of coupling cavities comprises three coupling cavities of substantially the same shape, and wherein two of the coupling cavities are larger than a remaining coupling cavity, and wherein the remaining coupling cavity is disposed between the two coupling cavities.

19. The waveguide body of claim 7, wherein light mixing features are disposed on a side of the waveguide body opposite the plurality of light extraction features to promote mixing of the light.

20. The optical waveguide body of claim 15, wherein the two control surfaces and the two coupling surfaces are disposed at an end surface of the waveguide body.

\* \* \* \* \*